United States Patent
Pustovalov et al.

(10) Patent No.: US 9,793,965 B1
(45) Date of Patent: Oct. 17, 2017

(54) FREQUENCY ORTHOGONALIZED MIMO CHANNEL SOUNDING AND FEEDBACK IN A WIRELESS HOME NETWORK

(71) Applicant: Quantenna Communications, Inc., Fremont, CA (US)

(72) Inventors: Evgenii Pustovalov, Saint-Petersburg (RU); Hossein Dehghan, Diablo, CA (US); Sigurd Schelstraete, Menlo Park, CA (US)

(73) Assignee: Quantenna Communications, Inc., Fremont, CA (US)

( * ) Notice: Subject to any disclaimer, the term of this patent is extended or adjusted under 35 U.S.C. 154(b) by 0 days.

(21) Appl. No.: 15/345,500

(22) Filed: Nov. 7, 2016

Related U.S. Application Data

(60) Provisional application No. 62/316,664, filed on Apr. 1, 2016.

(51) Int. Cl.
| | |
|---|---|
| *H04L 1/02* | (2006.01) |
| *H04B 7/0417* | (2017.01) |
| *H04B 7/0452* | (2017.01) |
| *H04W 84/12* | (2009.01) |
| *H04W 88/08* | (2009.01) |

(52) U.S. Cl.
CPC ......... *H04B 7/0417* (2013.01); *H04B 7/0452* (2013.01); *H04W 84/12* (2013.01); *H04W 88/08* (2013.01)

(58) Field of Classification Search
CPC ............................ H04B 7/0417; H04B 7/0452
See application file for complete search history.

(56) References Cited

U.S. PATENT DOCUMENTS

| | | | | |
|---|---|---|---|---|
| 8,891,710 | B2 * | 11/2014 | Roh | ........... H04L 25/0204 375/229 |
| 9,071,299 | B1 * | 6/2015 | Schelstraete | ........ H04B 7/0452 |
| 9,331,883 | B1 * | 5/2016 | Schelstraete | ........ H04L 27/2626 |

(Continued)

OTHER PUBLICATIONS

Unpublished US Patent Application: Inventors: Sigurd Schelstraete, Simon John Duxbury U.S. Appl. No. 14/701,495; Title: Composite Sounding for MIMO Beamforming in a Wireless Home Network, filed Apr. 30, 2015.

*Primary Examiner* — Helene Tayong
(74) *Attorney, Agent, or Firm* — IP Creators; Charles C. Cary

(57) ABSTRACT

A WAP including: a spatial mapper component, a partial sounding feedback expander circuit and a beamforming matrix calculator. The spatial mapper component spatially maps the transmission of a single MIMO sounding packet with either a single full spatial mapping matrix (SMM) or a set of "N" partial SMM responsive respectively to a full or composite sounding mode designation. The partial sounding feedback expander circuit in the composite sounding mode, expands partial sounding feedback received from a targeted station in response to the single MIMO sounding packet into a full sounding feedback. The beamforming matrix calculator calculates a full beamforming matrix for transmitting downlink communications to the targeted station from the full sounding feedback provided by either the partial sounding feedback expander circuit in the composite sounding mode, or the full sounding feedback received directly from the targeted station in the full sounding mode.

25 Claims, 10 Drawing Sheets

Method for MIMO WAP FDCS & Beamforming

(56) References Cited

U.S. PATENT DOCUMENTS

| | | | |
|---|---|---|---|
| 9,461,724 B1 | 10/2016 | Schelstraete | |
| 2004/0095907 A1* | 5/2004 | Agee | H04B 7/0417 370/334 |
| 2011/0141025 A1* | 6/2011 | Tsai | G06F 3/0489 345/168 |
| 2013/0315211 A1* | 11/2013 | Balan | H04B 7/0697 370/336 |

* cited by examiner

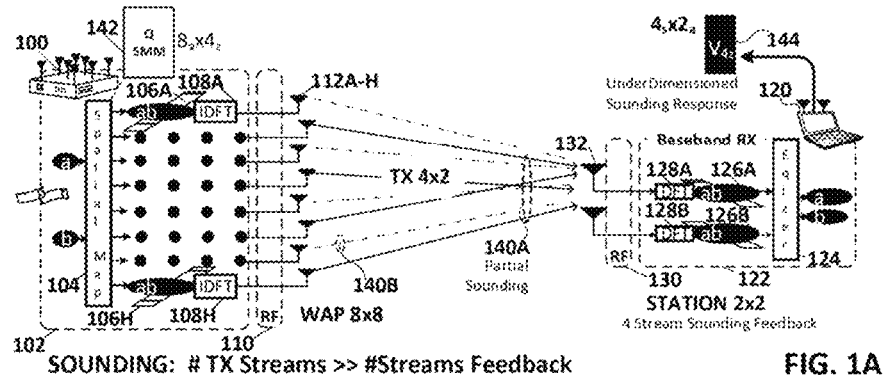
SOUNDING: # TX Streams >> #Streams Feedback    FIG. 1A
PRIOR ART: WAP constrained by STATION(s) Feedback Capability
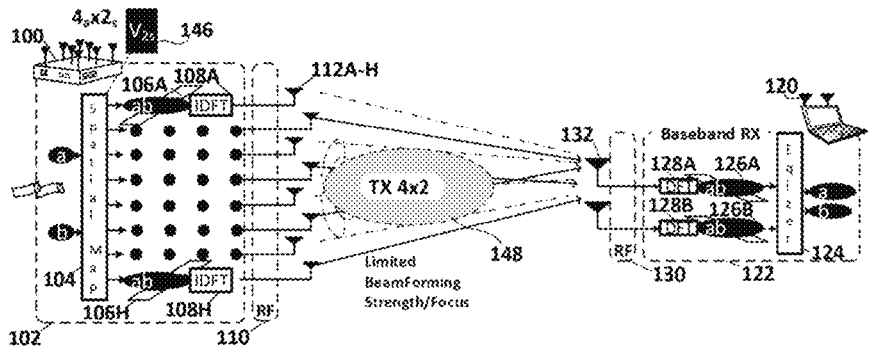
DOWNLINK: Redundant Beamforming on half the TX Antenna    FIG. 1B
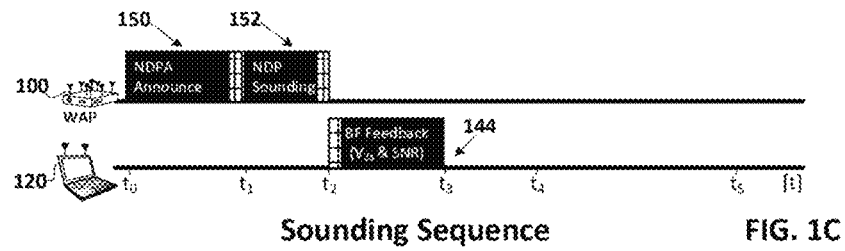
Sounding Sequence    FIG. 1C
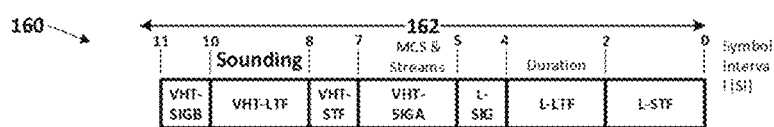
Sounding Packet    FIG. 1D

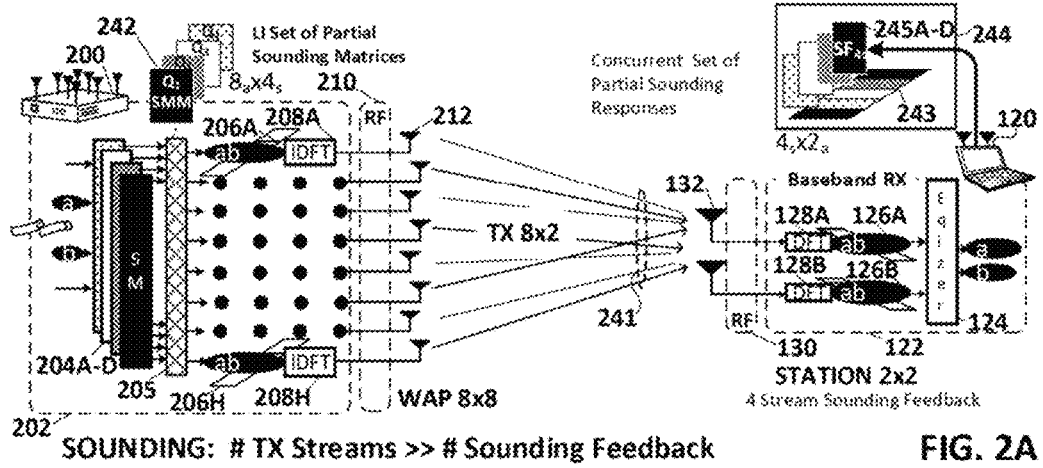
SOUNDING: # TX Streams >> # Sounding Feedback    FIG. 2A
WAP NOT constrained STATION(s) Feedback Capability
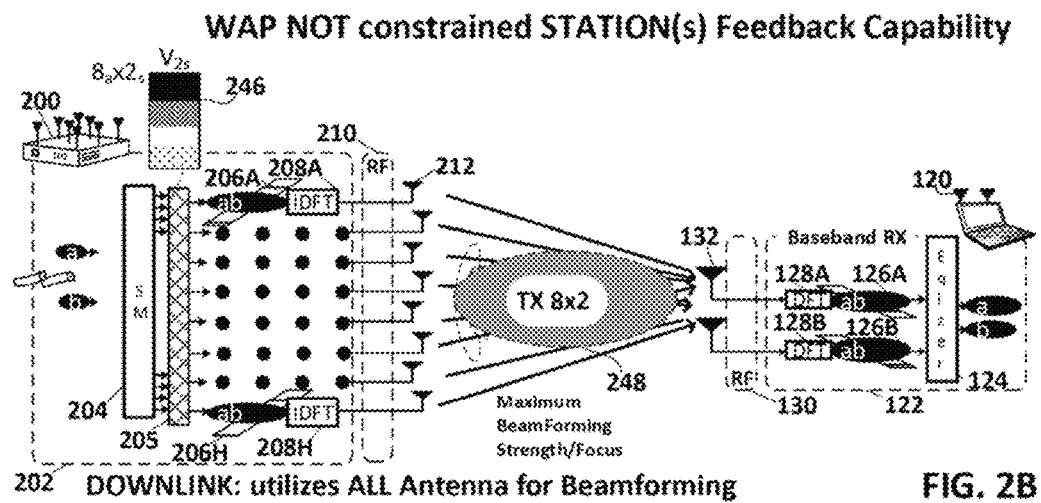
DOWNLINK: utilizes ALL Antenna for Beamforming    FIG. 2B
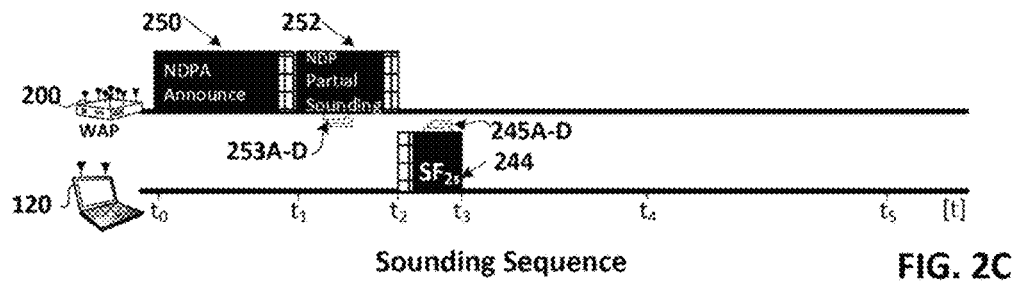
Sounding Sequence    FIG. 2C
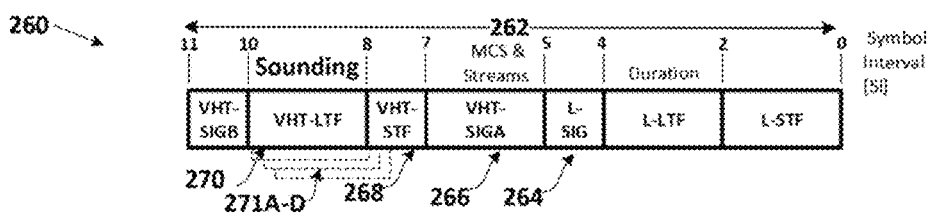
Single Sounding Packet with Composite Sounding Field    FIG. 2D
FREQUENCY DOMAIN COMPOSITE SOUNDING (FDCS)

FDCS
SOUNDING: Constrained Station; Feedback = Channel Matrix "H"

Construct FULL Beamforming Matrix from Sounding Feedback of Partial (Channel Matrices)

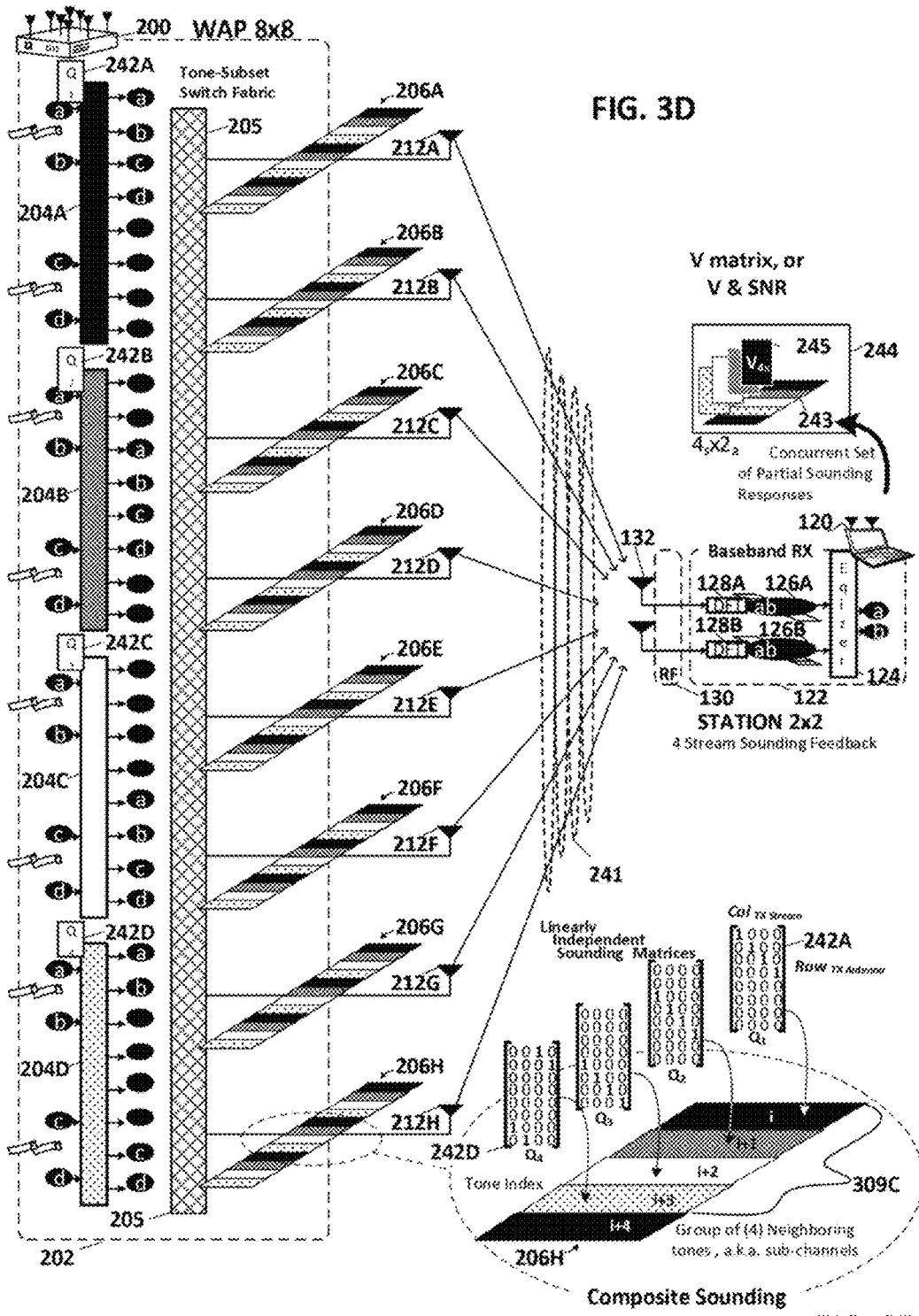

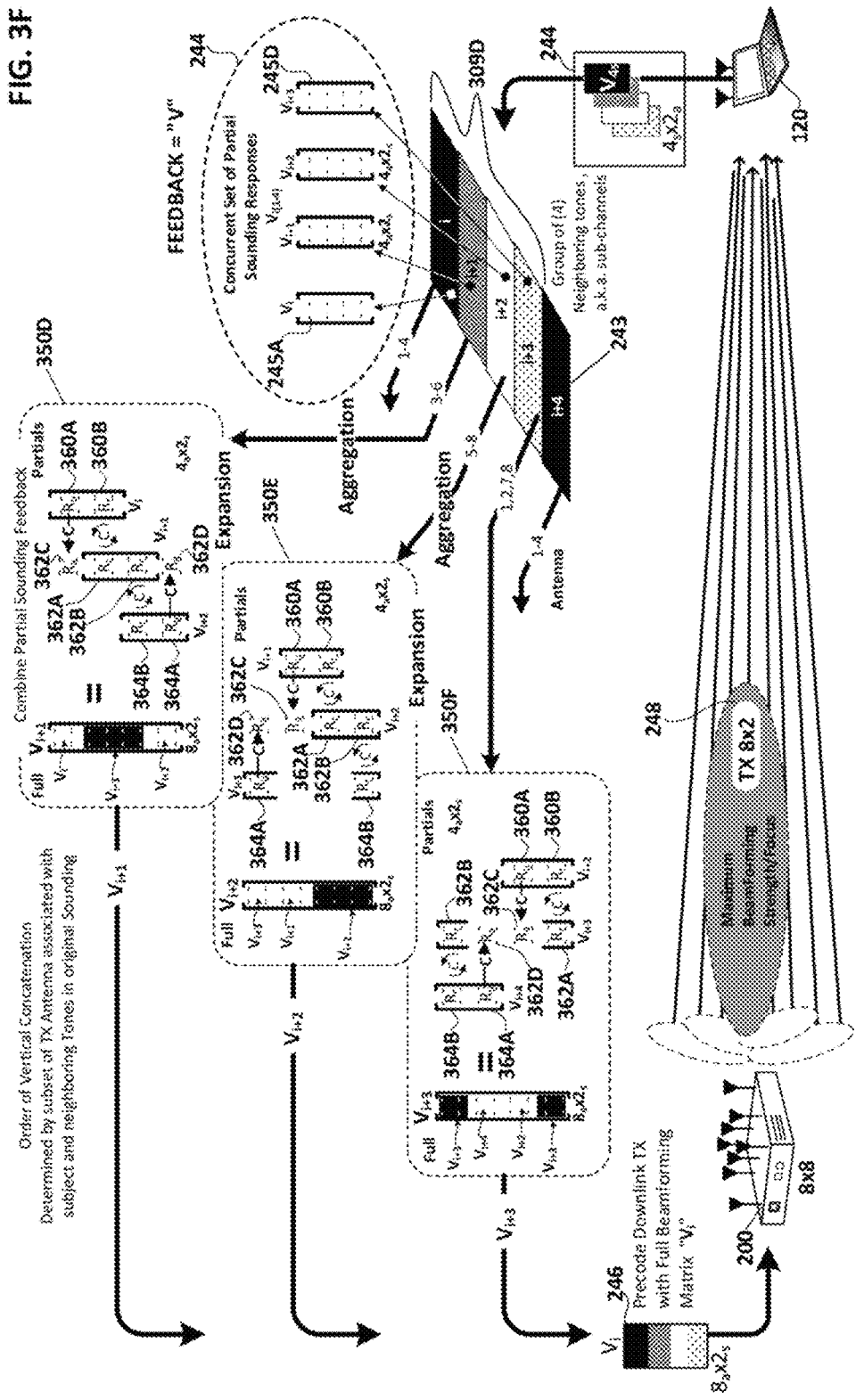

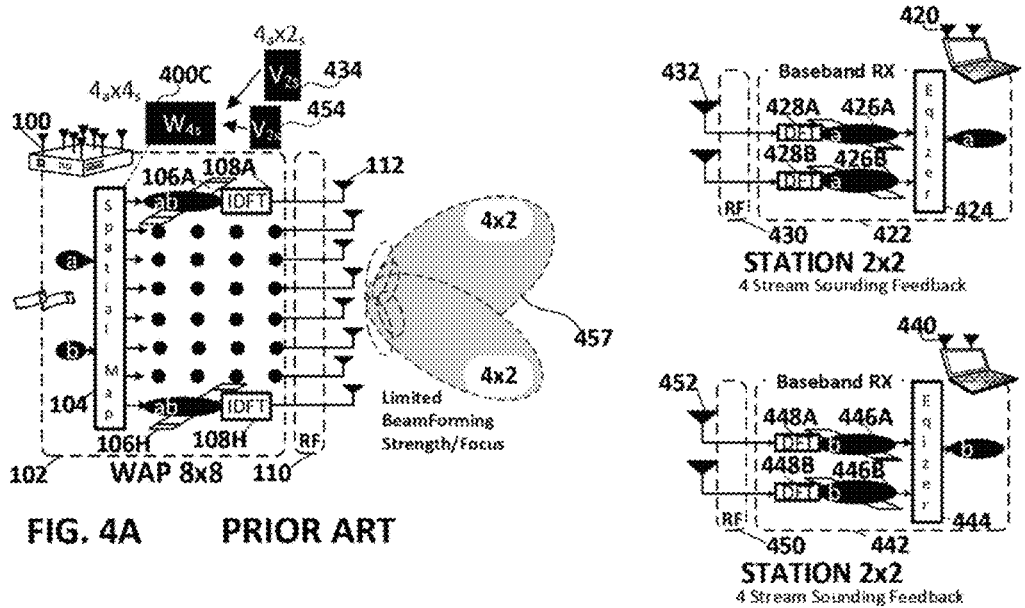
FIG. 4A    PRIOR ART
MU-MIMO to Stations with Limited Sounding Feedback Capability
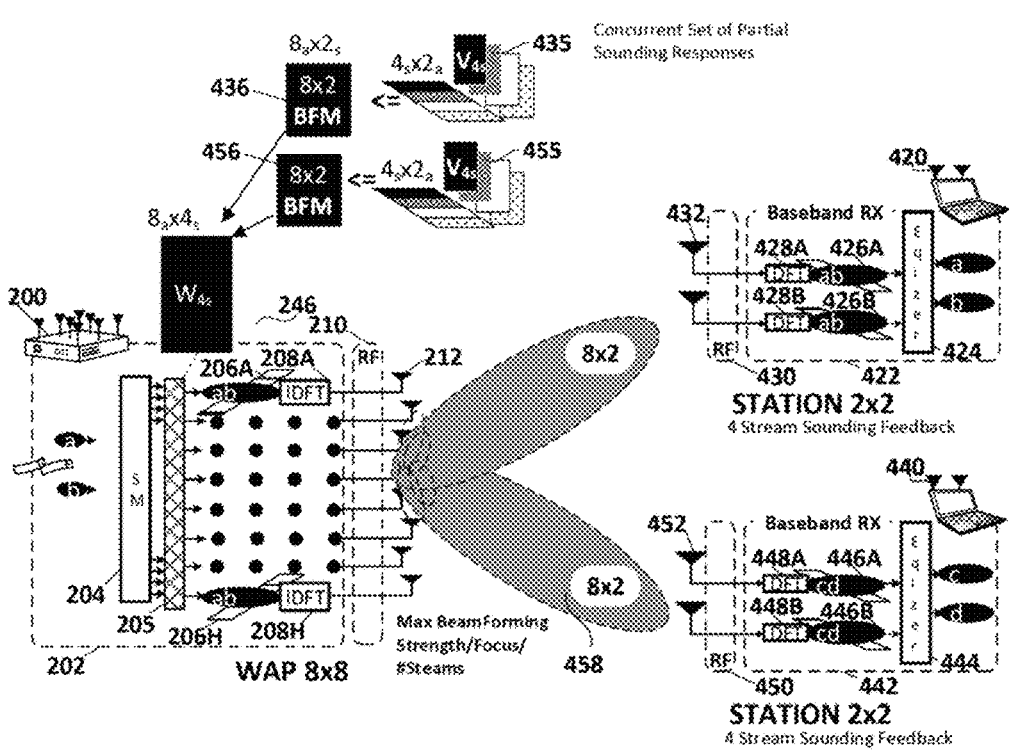
FIG. 4B    MU-MIMO FDCS Increase Beamforming Signal Strength

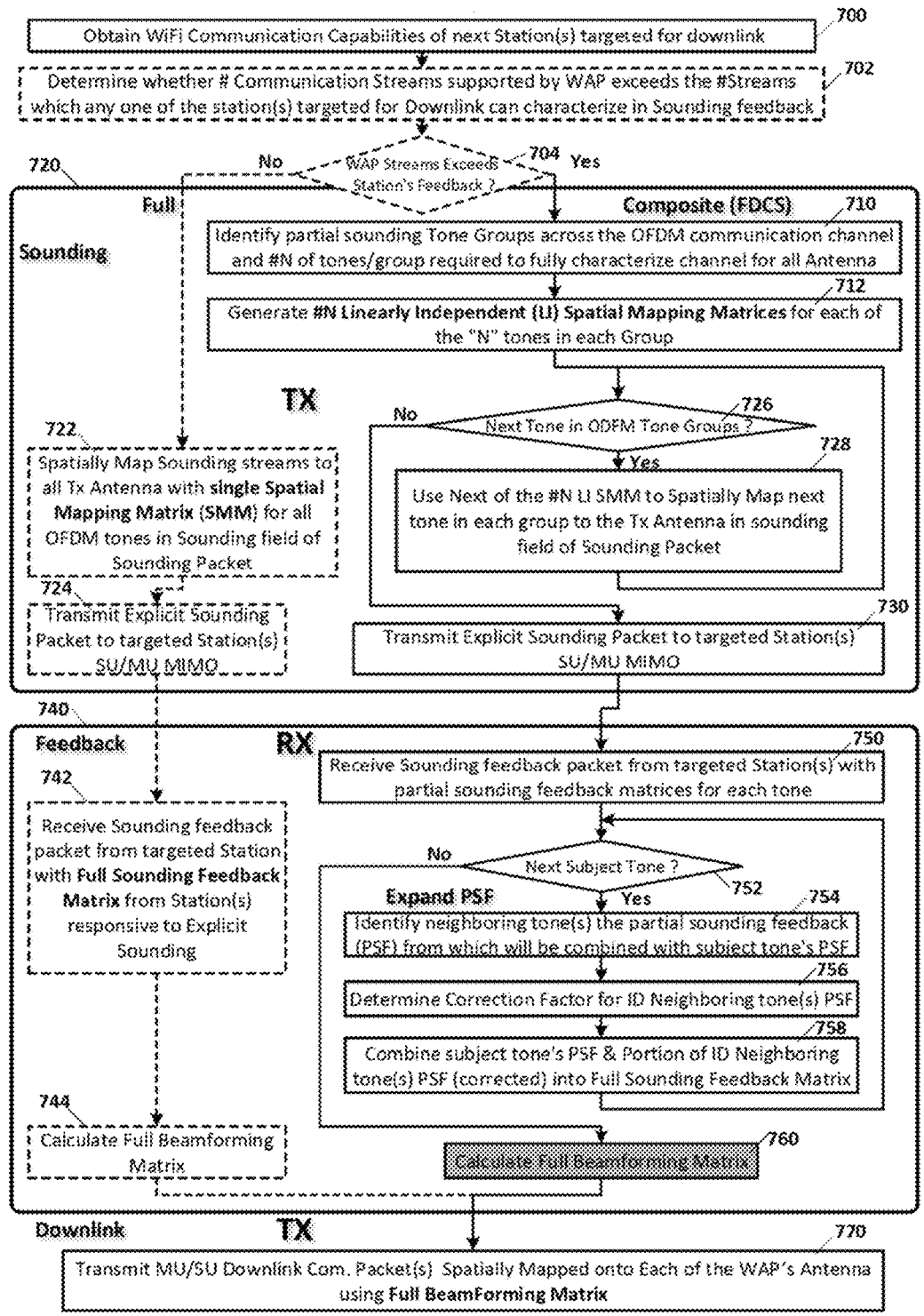
FIG. 7    Method for MIMO WAP FDCS & Beamforming

FREQUENCY ORTHOGONALIZED MIMO CHANNEL SOUNDING AND FEEDBACK IN A WIRELESS HOME NETWORK

CROSS REFERENCE TO RELATED APPLICATION

This application claims priority to Provisional Application No. 62/316,664 filed on Apr. 1, 2016 entitled "Efficient Channel Sounding and Feedback using Frequency Orthogonalization"; which is incorporated herein by reference in its entirety as if fully set forth herein.

BACKGROUND OF THE INVENTION

1. Field of Invention

The field of the present invention relates in general to wireless local area networks including wireless access points (WAP) and wireless stations and sounding methods therefore.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology for sharing a single communication medium, by having a contending communication link back off and retry access a prospective collision on the wireless medium is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP.

To characterize the communication channel between the WAP and each station, a sounding is conducted. An explicit sounding consists of the transmission of a known sequence from the WAP to each associated station, followed by a sounding response from the station characterizing the communication channel between the WAP and itself. The WAP uses the sounding response to focus its antennas in a manner which improves either or both signal strength at the station or downlink throughput thereto.

What is needed are improved methods for sounding each communication link between the WAP and its associated stations.

SUMMARY OF THE INVENTION

The present invention provides a method and apparatus for a wireless access point (WAP) apparatus to enhance communications with target stations that do not support sounding feedback which matches the capability of the WAP.

In an embodiment of the invention a wireless access point (WAP) supporting wireless communications with associated stations on a selected orthogonal frequency division multiplexed (OFDM) communication channel is disclosed. The WAP includes: a plurality of antenna, a plurality of components, a sounding mode circuit, a spatial mapper component, a partial sounding feedback expander circuit and a beamforming matrix calculator. The plurality of components are coupled to one another to form a plurality of the transmit and receive paths each coupled to a corresponding one of the plurality of antennas for multiple-input multiple-output (MIMO) communications on the OFDM tones of the selected communication channel. The sounding mode circuit designates one of a full sounding mode and a composite sounding mode for sounding at least one of the associated stations. The spatial mapper component spatially maps the wireless transmission of a sounding field of a single MIMO sounding packet with one of a full Spatial Mapping Matrices (SMM) and a set of "N" partial SMM each spatially mapping corresponding neighboring ones of the OFDM tones responsive respectively to the full and composite sounding mode designations by the sounding mode circuit. The partial sounding feedback expander circuit couples to the plurality of components forming the receive path and in the composite sounding mode, expands partial sounding feedback received from the at least one station in response to the single MIMO sounding packet, into a full sounding feedback. The beamforming matrix calculator couples to the plurality of components forming the receive path and to the partial sounding feedback expander circuit and calculates a full beamforming matrix for transmitting downlink communications to the at least one station from the full sounding feedback provided by one of the partial sounding feedback expander circuit in the composite sounding mode, and full sounding feedback received directly from the at least one station in the full sounding mode.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 1A-D are respectively Prior Art downlink sounding and communication system views, and sounding packet timing and packet structure diagrams of a communication link between a Wireless Access Point (WAP) and a station with constrained sounding capabilities;

FIGS. 2A-D are respectively downlink sounding and communication system views, and sounding packet timing and packet structure diagrams of a communication link between the WAP and the station with constrained sounding capabilities in accordance with an embodiment of the invention;

FIGS. 3A-F are detailed system views of a downlink composite sounding in the frequency domain and sounding feedback processing in accordance with an embodiment of the invention;

FIGS. 4A-B are system views of a multi-user (MU) multiple-input multiple-output (MIMO) downlink to stations with constrained sounding capabilities using a prior art sounding (FIG. 4A) and a composite sounding in in the frequency domain in accordance with an embodiment of the invention (FIG. 4B) respectively;

FIG. 7 is a process flow diagram of processes associated with enhanced sounding capabilities of a MU MIMO WAP in accordance with an embodiment of the current invention.

DETAILED DESCRIPTION OF THE EMBODIMENTS

Figures 3A, 3B:
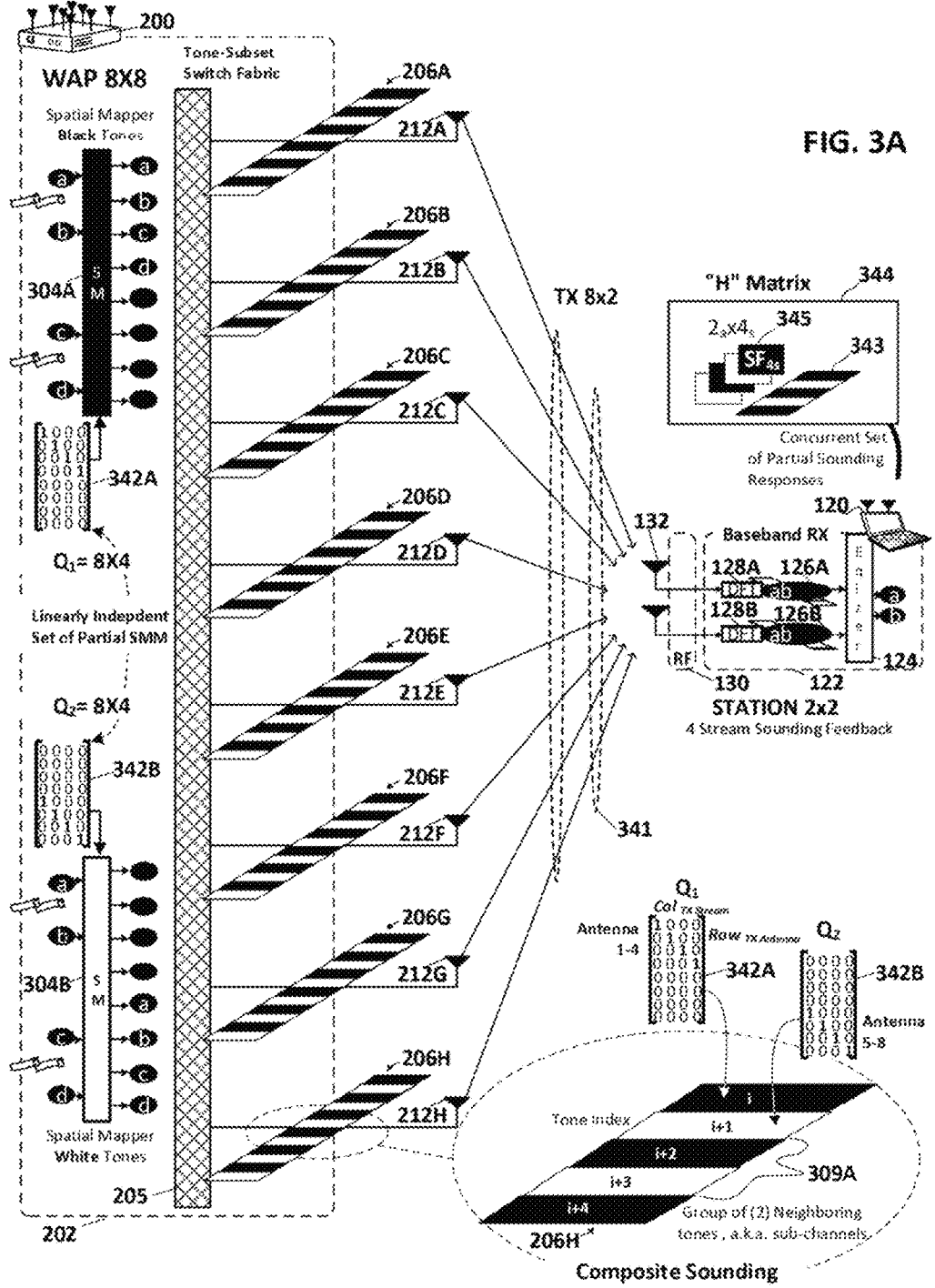

The present invention provides a method and apparatus for increasing downlink throughput from a multiple-input multiple-output (MIMO) WAP and a station.

FIGS. 1A-D are respectively Prior Art downlink sounding and communication system views, and sounding packet timing and packet structure diagrams of a communication link between a Wireless Access Point (WAP) and a station with constrained sounding capabilities.

FIG. 1A is a system diagram showing a sounding by a Prior Art WAP 100 of a downlink channel between it and a target station 120. The WAP, a.k.a. an 8×8 WAP, has 8 antennas and supports up to 8 streams of downlink and uplink communications. The WAP has a baseband section 102 and a radio frequency (RF) section 110 coupled to 8 multiple-input multiple-output (MIMO) antennas 112. The baseband transmit portion is shown and the corresponding receive portion is not. A spatial mapper 104 maps up to eight communication streams onto the communication chains associated each of the antenna. The mapping includes changes to the phase and amplitude of each stream to focus, a.k.a. beamform, the downlink communications to the station. The output of the spatial mapper is coupled to the input bins 106A-H of the inverse discrete Fourier Transform (IDFT) modules 108A-H which transform the transmitted communication from frequency to the time domain. These in turn couple through associated RF components with a corresponding one of the eight antenna 112. The station 120 is identified as a 2×2 device having two antenna and supporting up to 2 streams of downlink and uplink communications. The station has a baseband section 122 and a RF section 130 coupled to 2 MIMO antennas 132. The baseband receive portion is shown and the corresponding transmit portion is not. The discrete Fourier Transform (DFT) modules 128A-B are coupled to a corresponding one of the two antenna 132, to transform received communications from the time to the frequency domain. The output bins 126A-B of the DFT modules are coupled to the input of the equalizer 124. The sounding feedback capabilities of the station 120 do not match the WAPs capabilities in terms of number of streams and antennas. The WAP could handle up to 8 streams on a downlink sounding, but can't do so because the station is only capable of providing sounding feedback for up to four streams. This Prior Art sounding is limited to a single 8×4 spatial mapping matrix (SMM) "Q" 142 for the single sounding packet transmitted to the targeted station 120. The SMM maps the proscribed sounding bits and phases redundantly onto the MIMO antenna array, i.e. 2 pairs of antenna each have the same sounding signal, phase and amplitude. The sounding is said to be partial, e.g. 4×2, because it does not include unique signals on each of the antenna and thus does not allow channel characterization of all possible paths e.g. 140B (dotted lines) between the transmit and receive antennas of the WAP and station respectively. The station 120 receives this partial sounding 140A and determines the four stream 4×2 sounding feedback matrix "V" 144 which is transmitted by the station back to the WAP, to help to focus the subsequent downlink communications transmitted by the WAP to the station.

As shown in FIG. 1B the Prior Art WAP 100 transforms the single 4×2 sounding feedback matrix 144 received from the station in its sounding response into a beamforming matrix, e.g. a 4×2 beamforming matrix 146, for input to the spatial mapper 104, to steer/focus/beamform 148 the downlink communications of two streams from its MIMO antenna array. Unfortunately, the beamforming signal strength or focus 148 is limited by the lack of a complete characterization of all the possible paths between Transmit and Receive antennas during the single sounding. In other words, with a single four stream sounding response provided by the station 120 the WAP is unable to fully characterize the downlink communication channel, thus degrading its beamforming capabilities.

FIG. 1C is a Prior Art detailed explicit sounding timing diagram showing a detailed view of a representative Prior Art sounding as shown in FIG. 1A. An Explicit sounding of the link channel between the WAP 100 and station 120 is shown. The packets 150,152, 144 are all associated with the sounding. Packet 150 is a Null Data Packet Announcement (NDPA), packet 152 is a null data packet (NDP) with the actual sounding field, and packet 144 contains the sounding feedback response. All packets including those associated with the sounding, include a header portion shown in crosshatch. Following the sounding, communications resume and downlink communication of user data is sent on the link(s) that have been sounded. These user data packet(s) are sent using the associated beamforming matrix determined during the preceding sounding.

The explicit sounding provided for in the IEEE 802.11ac standard allows the receiver to assist the transmitter to steer subsequent user data communications toward the receiver using the sounding feedback transmitted by the receiver back to the WAP in response to the explicit link channel sounding initiated by the WAP. An explicit sounding may be initiated by a WAP or a station. In the example shown the WAP 102 initiates the sounding by sending at time $t_0$ the NDPA frame 150. The NDPA identifies the WAP and the target recipient station(s) for the sounding. Next at time $t_1$ the NDP 152 is sent by the WAP. This packet like all the other packets associated with the sounding contains no user data rather the header of the packet contains a ubiquitous preamble field, which in the case of the IEEE 802.11ac standard is identified as the VHT-LTF field 170 shown in FIG. 1D. The VHT-LTF field a.k.a. channel estimation or sounding field, contains a long training sequence used for MIMO channel estimation by the receiver. Each recipient device then determines the corresponding beamforming matrix required to adjust the phase and amplitude of subsequent MIMO transmissions by the WAP so as to improve the received signal strength at the receiving station. The target e.g. station 120 then responds at time $t_2$ with the sounding feedback packet 144 containing channel state information (CSI) including in this example, the beamforming matrix "V". In the example shown, the "V" matrix is a 4×2 matrix. If the receiving station is IEEE 802.11ac compliant the sounding feedback is in the form of the actual unitary beamforming matrix V and the per tone diagonal matrix Σ which is directly related to the per tone signal-to-noise ratio (SNR).

FIG. 1D is a packet diagram of a WLAN sounding packet including the sounding field thereof. All WLAN packets whether associated with communicating a sounding or with the communication of user data include a ubiquitous header portion. All WLAN packet headers include various preamble fields with known sequences which allow the receiving station to synchronize reception with packet boundaries and to determine the received channel. What makes a sounding packet a sounding packet is not the sounding field in the header, rather the NDPA payload instructions which identify the receiving station(s) which are requested to share their channel analysis, e.g. CSI, with the transmitter so as to improve its subsequent communications. FIG. 1D shows such a packet 160 and the corresponding symbol interval (SI) required to transmit each field thereof. The header 162A includes a legacy portion containing the L-STF, L-LTF and L-SIG fields and a very high throughput portion containing the VHT-SIG-A, VHT-STF, VHT-LTF and VHT-SIG-B fields. The legacy (L), long (LTF) and short (STF) training and signal (SIG) 164 fields are compatible with stations supporting only the IEEE 802.11n or earlier standards. The remaining signal and training fields are intended only for very high throughput, e.g. IEEE 802.11ac compliant devices. The VHT-SIG-A field 166 contains information on the modulation and coding scheme (MCS) and number of streams of the sounding. The VHT-STF field 168 is used for automatic gain control (AGC). The VHT-LTF field 170, a.k.a. channel estimation or sounding field, contains a long training sequence used for MIMO channel estimation by the receiver.

FIGS. 2A-D are respectively downlink sounding and communication system views, and sounding packet timing and packet structure diagrams of a communication link between a WAP and a station with constrained sounding capabilities in accordance with an embodiment of the invention.

FIG. 2A is a system diagram showing a composite sounding by WAP 200 of a downlink channel between it and the target station 120. The WAP, a.k.a. an 8×8 WAP, has 8 antennas and supports up to 8 streams of downlink and uplink communications. The WAP has a baseband section 202 and a radio frequency (RF) section 210 coupled to 8 multiple-input multiple-output MIMO antennas 212. The baseband transmit portion is shown and the corresponding receive portion is not. A spatial mapper 204A-D maps up to eight communication streams onto the communication chains associated each of the antenna. The mapping includes changes to the phase and amplitude of each stream to focus, a.k.a. beamform, the downlink communications to the station. The output of the spatial mapper is in an embodiment of the invention coupled through a tone-subset switch fabric 205 to the input bins 206A-H of the inverse discrete Fourier Transform (IDFT) modules 208A-H which transform the transmitted communication from frequency to the time domain. These in turn couple through associated RF components with a corresponding one of the eight antenna 212. The station 120 is identified as a 2×2 device having two antennae and supporting up to 2 streams of downlink and uplink communications. The station has a baseband section 122 and an RF section 130 coupled to 2 MIMO antennas 132. The baseband receive portion is shown and the corresponding transmit portion is not. The DFT modules 128A-B are coupled to a corresponding one of the two antenna 132, to transform received communications from the time to the frequency domain. The output bins 126A-B of the DFT modules are coupled to the input of the equalizer 124. The sounding feedback capabilities of the station 120 do not match the WAPs capabilities in terms of number of streams and antennas. The WAP detects this sounding capability mismatch and identifies partial sounding tone groups across the OFDM communication channel and the number #N of tones per group required to fully characterize the channel between all its antenna and the station in one sounding packet. The WAP generates #N linearly independent (LI) spatial mapping matrices (SMM) 242 each spatially mapping a corresponding one of the tones in each group that will allow for full characterization of the downlink communication channel between the WAP and the station. In the embodiment of the invention shown in FIG. 2A the sounding of the OFDM tones of the communication channel are split into contiguous groups of 4 neighboring tones each and with each tone spatially mapped with a corresponding one of the 4 LI SMM 242 identified as $Q_1$, $Q_2$, $Q_3$, $Q_4$. Each sub-channel/tone is said to be partially sounded because in this example the associated sounding involves only a subset of the WAP's antennas. Across each group of tones however, all the WAP's antenna are collectively sounded in the single 8×2 composite sounding packet transmitted by the WAP. The WAP transmits this single sounding packet 252 composed of these Linearly Independent partial soundings using the #N, LI SMM, and receives in response a single partial sounding response 244. The partial sounding response 244 is, in the example shown a 4×2 matrix which provides partial sounding feedback, a.k.a. channel state information (CSI), for each of the OFDM tones 243 that were sounded. The sounding feedback is characterized as partial since the CSI for any one tone provides feedback only as to a subset of the WAP's antenna. However collectively the partial sounding feedback on each group of tones 245A-D provides CSI for all the WAP's antenna.

As shown in FIG. 2B the WAP 200 expands the partial sounding feedback into a full 8×2 beamforming matrix 246 for beamforming subsequently transmitted downlink communication packets to the station. This fully dimensioned beamforming matrix maximizes the RF signal strength 248 from the MIMO antenna array at the antennas 132 of the receiving station 120. The WAP's improved 8×2 downlink transmission capability, corresponds to a 3-6 dB improvement in signal strength as opposed to the single sounding of the prior art WAP shown in FIGS. 1A-B.

FIG. 2C is a detailed explicit sounding timing diagram showing a representative composite sounding in accordance with an embodiment of the invention shown in FIG. 2A. An Explicit sounding of the link channels between the WAP 200 and station 120 are shown. The packets 250, 252, 244 are all associated with the composite sounding. All packets including those associated with the sounding, include a header portion shown in crosshatch. Following the sounding, communications resume, and user data packets are transmitted on the link(s) that have been sounded. These user data packet(s) are sent using the associated beamforming matrix determined during the preceding composite sounding.

The explicit sounding provided for in the IEEE 802.11ac standard allows the receiver to assist the transmitter to steer subsequent user data communications toward the receiver using the beamforming matrix provided by the receiver in response to the explicit link channel sounding initiated by the transmitter. An explicit sounding may be initiated by a WAP or a station. In the example shown the WAP 200 initiates the sounding by sending at time $t_0$ a NDPA frame 250. The NDPA identifies the WAP and the target recipient station(s) for the sounding. Where more than one station is a target recipient, the order in which the recipient stations are listed controls the order of their response. Next at time $t_1$ a NDP 252 is sent by the WAP. This packet contains no user data rather the header of the packet contains a ubiquitous preamble field, which in the case of the IEEE 802.11ac standard is identified as the VHT-LTF field 270 shown in FIG. 2D. The VHT-LTF field a.k.a. channel estimation or sounding field, contains a long training sequence used for MIMO channel estimation by the receiver. In this case, however the sounding field of the sounding packet 252 consists of the partial soundings 253A-D within each sequential group of neighboring OFDM tones. Each IEEE 802.11ac compliant recipient device then determines the corresponding beam steering/beamforming matrix, i.e. "V" and "SNR", required to adjust the phase and amplitude of subsequent MIMO transmissions by the WAP so as to maximize the received signal strength at the receiving station. The target e.g. station 120 then responds at time $t_2$ with the sounding feedback packet 244 containing channel state information (CSI) for each of the sounded tones. Collectively the partial sounding feedback on each group of tones 245A-D provides CSI for all the WAP's antenna. If the receiving station is IEEE 802.11ac compliant the feedback is in the form of the actual unitary beam steering matrix V as well as for MU-MIMO feedback the per tone diagonal matrix SNR. If the receiving station is IEEE 802.11n compliant the feedback may be in the form of the channel Matrix "H" or the "V" matrix. Any remaining stations targeted by the initial sounding, respond with the beam steering matrix for their own link when asked to do so by the WAP. The WAP in this embodiment of the invention has determined based on the mismatch between the # of streams supported by the WAP and the number of streams in sounding feedback from the station that a composite sounding is required. The WAP then transmits this single sounding packet 252 composed of these Linearly Independent partial soundings within sequential groups of #N tones using the #N, LI SMM. Across each contiguous group of tones, all the WAP's antenna are collectively sounded in a single composite sounding packet transmitted by the WAP.

FIG. 2D is a packet diagram of a WLAN sounding packet including the sounding field thereof. All WLAN packets whether associated with communicating a sounding or with the communication of user data include the ubiquitous header portion. All WLAN packet headers include various preamble fields with known sequences which allow the receiving station to synchronize reception with packet boundaries and to determine the received channel. What makes a sounding packet a sounding packet is not the sounding field in the header, rather the NDPA payload instructions which identify the receiving stations which are requested to share their channel analysis, e.g. CSI, with the transmitter so as to improve its subsequent communications. FIG. 1D shows such a packet 260 and the corresponding symbol interval (SI) required to transmit each field thereof. The header 262 includes the legacy portion containing the L-STF, L-LTF and L-SIG fields and the very high throughput portion containing the VHT-SIGA, VHT-STF, VHT-LTF and VHT-SIGB fields. The legacy (L), long (LTF) and short (STF) training and signal (SIG) 264 fields are compatible with stations supporting only the IEEE 802.11n or earlier standards. The remaining signal and training fields are intended only for very high throughput, e.g. IEEE 802.111ac compliant devices. The VHT-SIGA field 266 contains information on the modulation and coding scheme (MCS) and number of streams of the sounding. The VHT-STF field 268 is used for automatic gain control (AGC). The VHT-LTF field 270, a.k.a. channel estimation or sounding field, contains a long training sequence used for MIMO channel estimation by the receiver. In this case, however the sounding field, e.g. the VHTG-LTF field, of the single sounding packet 252 consists of the partial soundings 271A-D within each sequential group of neighboring OFDM tones. The VHT-LTF field of each sounding packet is spatially mapped within each group of #N OFDM tones with an associated one of a set of N linearly independent spatial mapping matrices as determined by the WAP.

In an embodiment of the invention the WAP supports both full and composite soundings. In another embodiment of the invention the WAP supports only composite soundings for stations regardless of whether they provide feedback of all streams which the WAP supports. A sounding is said to be "Full" when a single sounding matrix is involved in the sounding of each OFDM sub-channel/tone involving all the WAPs antennas and the number of streams sounded correspond to the maximum # streams which the WAP supports. A sounding is said to be "Composite" when it is conducted exclusively in the frequency domain on with a set of two or more SMM matrices used for sounding the OFDM tones throughout the sounding field, a.k.a. training field of a single sounding packet with each member of the set used for spatially mapping discrete corresponding ones of the OFDM tones and the subset/number of streams sounded by each of the SMM is less than the max streams which the WAP supports. A composite sounding is made up of concurrent partial soundings on each sub-channel/tone in which different subsets of the WAP's streams are involved in the sounding of each OFDM sub-channel/tone. A composite sounding may thus be characterized as Frequency Domain Composite Sounding (FDCS). Sounding feedback is said to be full when it results from a full sounding on each sub-channel/tone. Sounding feedback is said to be partial when it results from a partial sounding on each sub-channel/tone.

Figure 3C:
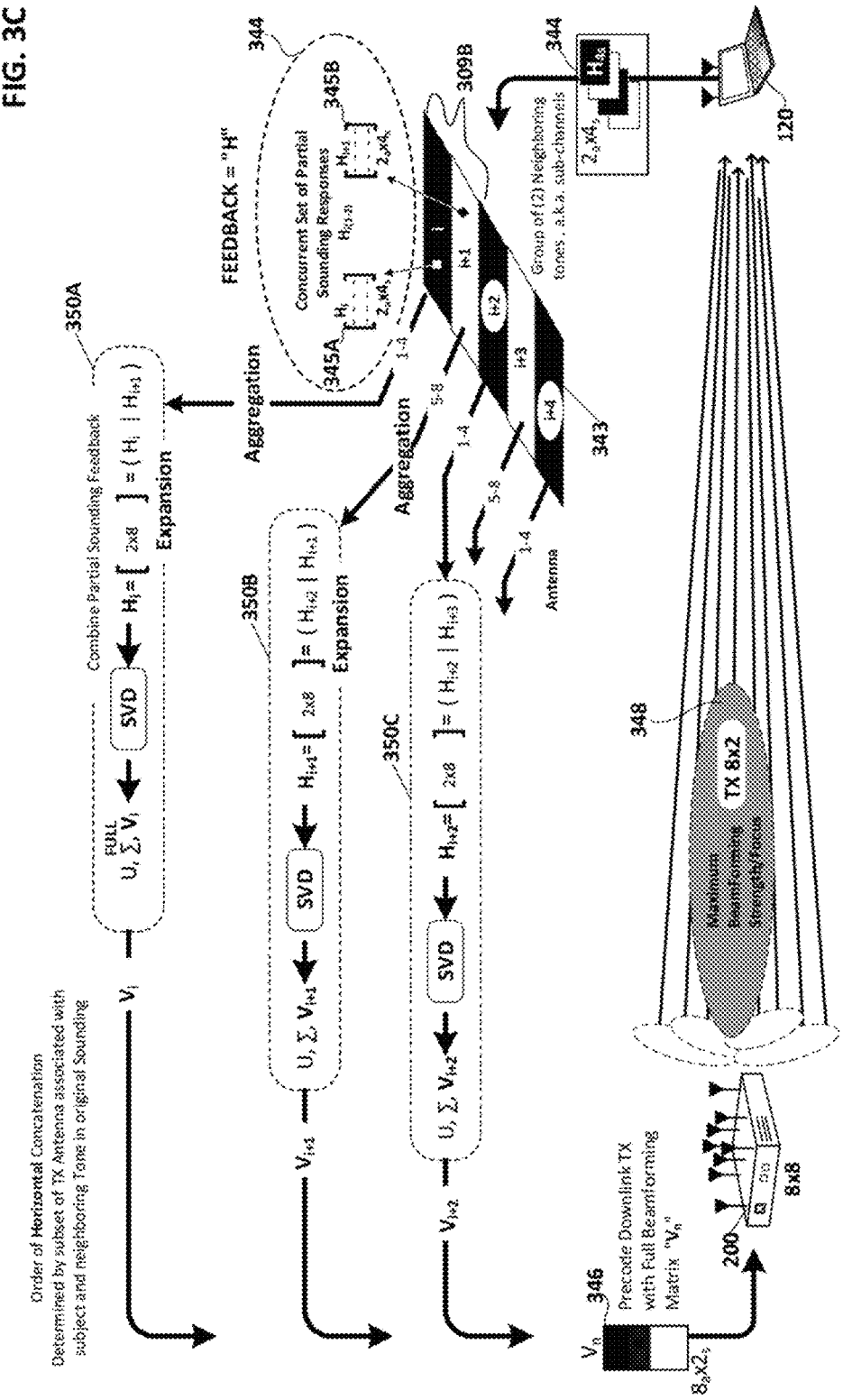

FIGS. 3A-F are detailed system views of a downlink composite sounding in the frequency domain and sounding feedback processing in accordance with an embodiment of the invention. FIGS. 3A-C cover an example of an embodiment of the invention in which the constrained target station provides partial sounding feedback in the form of the channel matrix "H".

FIGS. 3A-B show a composite sounding in a single sounding packet by WAP 200 of station 120 when the four-stream sounding feedback from targeted 2×2 station 120 comprises a channel matrix "H". FIG. 3B is a detailed view of the tone indices and 2 tone groupings 309A associated with the composite sounding at the input bins of the IDFT associated with one of the transmit paths, i.e. the one coupled to antenna 212H. WAP determines station capabilities including # feedback streams, and type of feedback. From this information, the WAP makes several determinations. The first determination is, that a composite sounding is required to exploit the full capabilities of the WAP, because the number of streams that the station can characterize in a sounding is less than the number of streams supported by the WAP. The second determination is that partial soundings of the communication channel for distinct subsets of the WAP's antenna 212A-H will be in groups of #N=2 tones each partially sounding the channel, via an associated one of #N=2 linearly independent SMM. This latter determination is based on both the ratio of the number of the WAP's antenna to the number of streams the station can characterize in its sounding feedback, together with the sounding feedback type, i.e. the channel matrix "H". During sounding and specifically transmission of the sounding field of the sounding packet, the output of the spatial mappers 304A-B couples through a tone-subset switch fabric 205 to a corresponding one of the two sub-channels/tones associated with each 2-tone group 309A of the input bins 206A-H of the inverse discrete Fourier Transform (IDFT) modules (not shown, see FIG. 2A), for spatially modulating transmission of the sounding field over a corresponding one of the WAP's antenna 212A-H. A first of the sub-channels/tones in each 2-tone group is spatially modulated via spatial mapper 304A with partial sounding matrix $Q_1$ 342A which spatially modulates the partial sounding over a first subset of the WAP's antenna, e.g. the first four antenna 212A-D. A second of the sub-channels/tones in each 2-tone group is spatially modulated via spatial mapper 304B with partial sounding matrix $Q_2$ 342B which spatially modulates the partial sounding over a second subset of the WAP's antenna, e.g. the last four antenna 212E-H. Matrices $Q_1$ and $Q_2$ are linearly independent of one another. The receiving station 120 processes the sounding and determines for each sub-channel/tone a corresponding partial channel matrix "$H_i$" in a partial sounding feedback packet 344 transmitted to the WAP, which contains for each OFDM tone 343 of the communication channel, the corresponding partial channel matrix 345.

FIG. 3C shows a detailed view of the WAP processing associated with determining a beamforming matrix from the sounding feedback 344 received from station 120 as a result of the sounding shown in FIGS. 3A-B. In the example shown station 120 provides a sounding response packet 344 which provides 4 stream feedback in the form of the channel matrix "$H_i$" for each of the sounded OFDM tones 343. The WAP knows which tone groups in the sounding feedback 309B are associated with each partial sounding group 309A and for each tone/sub-channel the subset of streams and antenna over which the sounding was spatially mapped. The sounding feedback partial channel matrices $H_i$ 345A and $H_{i+1}$ 345B for one group of tones 309B are shown. The numbers on each tone 343 are the tone indices. The numbers to the left of each tone are the subset of antenna over which the partial sounding of that tone was spatially mapped. The WAP processes the sounding feedback by expanding the partial sounding feedback of each tone being processed, a.k.a. a subject tone, with all or part of the partial sounding feedback of one or more of the neighboring tones. Process blocks 350A-C show the processing associated with determining the beamforming matrix for respectively, tones with indices i, i+1, and i+2. In process block 350A the WAP expands the partial sounding feedback, i.e. a 2×4 "H" matrix, from the subject tone "i" with partial sounding feedback, i.e. a 2×4 "H" matrix, of a neighboring tone "i+1". In this case the expansion is achieved by horizontal concatenation, of the partial sounding feedback of the subject tone and neighboring tone to produce a 2×8 full sounding feedback matrix which in this case is the channel matrix "$H_i$". The order of concatenation is determined by the WAP antenna which contributed to the partial sounding, i.e. antenna 1-4 to "$H_i$" and antenna 5-8 to $H_{i+1}$. The WAP then performs a singular value decomposition (SVD) to determine the resultant: "U", "Σ" and "$V_i$" matrices. Where $V_i$ is the desired beam steering matrix for spatial mapping the subsequent downlink packet transmissions on the subject tone. Process blocks 350B shows similar processes for expanding the partial sounding feedback from the next subject tone "i+1" using a contribution from neighboring tone "i+2". The order of horizontal concatenation is reversed to reflect the fact that "$H_{i+2}$" reflects the channel information from sounding transmitted from WAP antenna 1-4 and "$H_{i+1}$" reflects the channel information from a sounding transmitted from WAP antenna 5-8. The WAP then performs an SVD to determine the resultant matrices, including the desired beamforming matrix $V_{i+1}$ for spatial mapping the subsequent downlink packet transmissions on the subject tone. Process blocks 350C shows similar processes for expanding the partial sounding feedback from the next subject tone "i+2" using a contribution from neighboring tone "i+3". The horizontal concatenation of the partial sounding feedback matrices for the subject and neighboring tones/sub-channels is ordered in the same sequence as the WAP's antenna that transmitted the sounding on each of the sub-channels/tones. The WAP then performs an SVD to determine the resultant matrices, including the desired beamforming matrix $V_{i+2}$ for spatial mapping the subsequent downlink packet transmissions on the subject tone. Each of the OFDM tones 343 is processed in the same manner and once all are determined the resultant full beamforming matrices "$V_n$" 346 are used for spatially mapping transmission on all ODFM sub-channels/tones of the selected communication channel of subsequent downlink communication packets to the targeted station(s) 120.

FIGS. 3D-F cover an example of an embodiment of the invention in which the constrained target station provides partial sounding feedback in the form of the beamforming matrix "V".

FIGS. 3D-E show a composite sounding in a single sounding packet by WAP 200 of station 120 when the four-stream sounding feedback from targeted 2×2 station 120 comprises a beamforming matrix "V". FIG. 3E is a detailed view of the tone indices and 4 tone groupings 309C associated with the composite sounding at the input bins of the IDFT associated with one of the transmit paths, i.e. the one coupled to antenna 212H. WAP determines station capabilities including # feedback streams, and type of feedback. From this information, the WAP makes several determinations. The first determination is, that a composite sounding is required to exploit the full capabilities of the WAP, because the number of streams that the station can characterize in a sounding is less than the number of streams supported by the WAP. The second determination is that partial soundings of the communication channel for distinct subsets of the WAP's antenna 212A-H will be in groups of #N=4 tones each partially sounding the channel, via an associated one of #N=4 linearly independent SMM. This latter determination is based on both the ratio of the number of the WAP's antenna to the number of streams the station can characterize in its sounding feedback, together with the sounding feedback type, i.e. the beamforming matrix "V". During sounding and specifically transmission of the sounding field of the sounding packet, the output of the spatial mappers 204A-D couples through a tone-subset switch fabric 205 to a corresponding one of the four sub-channels/tones associated with each 4-tone group 309C of the input bins 206A-H of the inverse discrete Fourier Transform (IDFT) modules (not shown, see FIG. 2A), for spatially modulating transmission of the sounding field over a corresponding one of the WAP's antenna 212A-H. A first of the sub-channels/tones in each 4-tone group is spatially modulated via spatial mapper 204A with partial sounding matrix $Q_1$ 242A which spatially modulates the partial sounding over a first subset of the WAP's antenna, e.g. the first four antenna 212A-D. A second of the sub-channels/tones in each 4-tone group is spatially modulated via spatial mapper 204B with partial sounding matrix $Q_2$ 242B which spatially modulates the partial sounding over a second subset of the WAP's antenna, e.g. the middle four antenna 212C-F. A third of the sub-channels/tones in each 4-tone group is spatially modulated via spatial mapper 204C with partial sounding matrix $Q_3$ 242C which spatially modulates the partial sounding over a third subset of the WAP's antenna, e.g. the last four antenna 212E-F. A fourth of the sub-channels/tones in each 4-tone group is spatially modulated via spatial mapper 204D with partial sounding matrix $Q_4$ 242D which spatially modulates the partial sounding over a fourth subset of The WAP's antenna, e.g. the first and last two antenna 212A-B and 212G-H. Matrices $Q_1$, $Q_2$, $Q_3$, and $Q_4$ are linearly independent of one another. The receiving station 120 processes the sounding and determines for each sub-channel/tone a corresponding partial beamforming matrix "$V_i$" in a partial sounding feedback packet 244 transmitted to the WAP, which contains for each OFDM tone 243 of the communication channel, the corresponding partial beamforming matrix 245.

FIG. 3F shows a detailed view of the WAP processing associated with determining a beamforming matrix from the partial sounding feedback 244 received from station 120 as a result of the sounding shown in FIGS. 3D-E. In the example shown station 120 provides a partial sounding feedback packet 244 which provides 4 stream feedback in the form of the partial beamforming matrix "$V_i$" for each of the sounded OFDM tones 243. The WAP knows which tone groups in the sounding feedback 309D are associated with each partial sounding group 309C and for each tone/sub-channel the subset of streams and antenna over which the sounding was spatially mapped. The sounding feedback partial beamforming matrices $V_i$, $V_{i+1}$, $V_{i+2}$, and $V_{i+3}$ respectively 245A-D for one group of tones 309D are shown. The numbers on each tone 243 are the tone indices. The numbers to the left of each tone are the subset of antenna over which the partial sounding of that tone was spatially mapped. The WAP processes the sounding feedback by expanding the partial sounding feedback of each tone being processed, a.k.a. a subject tone, with all or part of the partial sounding feedback of one or more of the neighboring tones. Process blocks 350D-F show the processing associated with determining the beamforming matrix for respectively, tones with indices i+1, i+2, and i+3.

In process block 350D the WAP expands the partial sounding feedback, i.e. a 4×2 "V" matrix, from the subject tone "i+1" with partial sounding feedback, i.e. a 4×2 "V" matrix, of the neighboring tones "i" and "i+2". In this case the expansion is achieved by vertical concatenation, of the partial sounding feedback of the subject tone with corrected contributions from unique pairs of rows of the partial sounding feedback matrices from the neighboring tones, to produce a 8×2 full sounding feedback matrix which in this case is the full beamforming matrix "$V_{i+1}$". Specifically, the WAP determines that the partial sounding feedback for the subject tone "i+1" characterizes the sounding transmitted from a subset of the WAP antenna, i.e. antenna 3-6. The neighboring tones which provide the missing sounding feedback for the subject tone "i+1" are identified as tones "i" and "i+2". The neighboring tone "i" is identified as having partial sounding feedback for WAP antenna 1-2 in unique rows "Ru" 360A of its associated partial sounding feedback matrix $V_i$. Next, a correction factor for adjusting rows 360A is determined from redundantly sounded rows "Rr" 360B in the $V_i$ matrix and 362A in the subject matrix $V_{i+1}$. These rows reflect the sounding feedback information on the subject and neighboring tone for WAP antennas 3-4. The correction factor is used to adjust/correct for differences in sounding feedback between adjacent tones "i" and "i+1". The WAP determines a correction factor for the redundant rows and applies it to unique rows 360A. The resultant adjusted rows "Ra" are vertically concatenated onto the top of the partial sounding matrix $V_{i+1}$ of the subject tone as adjusted new rows 362C. The WAP then repeats the same procedure for the other contributing neighboring tone, i.e. tone "i+2". The neighboring tone "i+2" is identified as having partial sounding feedback for WAP antenna 7-8 in unique rows "Ru" 364A of its associated partial sounding feedback matrix $V_{i+2}$. Next, a correction factor for adjusting rows 364A is determined from redundantly sounded rows "Rr" 364B in the $V_{i+2}$ matrix and 362B in the subject matrix $V_{i+1}$. These rows reflect the sounding feedback information on the subject and neighboring tone for WAP antennas 5-6. The correction factor is used to adjust/correct for differences in sounding feedback between adjacent tones "i+1" and "i+2". The WAP determines a correction factor for the redundant rows and applies it to unique rows 364A. The resultant adjusted rows "Ra" are vertically concatenated onto the bottom of the partial sounding matrix $V_i$ as adjusted new rows 362D. The resultant full beamforming matrix Vi+1 for the subject tone includes contributions from the two neighboring tones "i" and "i+2".

In process block 350E the WAP expands the partial sounding feedback from the subject tone "i+2" with partial sounding feedback of the neighboring tones "i+1" and "i+3". The expansion is achieved by vertical concatenation, of the partial sounding feedback of the subject tone with corrected contributions from the partial sounding feedback matrices from the neighboring tones. The partial sounding feedback for the subject tone "i+1" characterizes the sounding transmitted from a subset of the WAP antenna, i.e. antenna 5-8. The neighboring tone "i+1" is identified as having partial sounding feedback for WAP antenna 3-4 in unique rows 360A of its associated partial sounding feedback matrix $V_{i+1}$. The correction factor for adjusting rows 360A is determined from redundantly sounded rows 360B in the $V_{i+1}$ matrix and 362A in the subject matrix $V_{i+2}$. These rows reflect the sounding feedback information on the subject and neighboring tone for WAP antennas 5-6. The WAP determines a correction factor for the redundant rows and applies it to unique rows 360A. The resultant adjusted rows 362C are vertically concatenated onto the partial sounding matrix $V_{i+2}$ of the subject tone as adjusted new rows 362C. The WAP then repeats the same procedure for the other contributing neighboring tone, i.e. tone "i+2". The neighboring tone "i+3" is identified as having partial sounding feedback for WAP antenna 1-2 in unique rows 364A of its associated partial sounding feedback matrix $V_{i+2}$. Next, a correction factor for adjusting rows 364A is determined from redundantly sounded rows 364B in the $V_{i+3}$ matrix and 362B in the subject matrix $V_{i+2}$. These rows reflect the sounding feedback information on the subject and neighboring tone for WAP antennas 7-8. The WAP determines a correction factor for the redundant rows and applies it to unique rows 364A. The resultant adjusted rows are vertically concatenated onto the partial sounding matrix $V_i$ as adjusted new rows 362D. The resultant full beamforming matrix Vi+2 for the subject tone includes contributions from the two neighboring tones "i+1" and "i+3".

In process block 350F the WAP expands the partial sounding feedback from the subject tone "i+3" with partial sounding feedback of the neighboring tones "i+2" and "i+4". The expansion is achieved by vertical concatenation, of the partial sounding feedback of the subject tone with corrected contributions from the partial sounding feedback matrices from the neighboring tones. The partial sounding feedback for the subject tone "i+2" characterizes the sounding transmitted from a subset of the WAP antenna, i.e. antenna 1-2, 7-8. The neighboring tone "i+2" has partial sounding feedback for WAP antenna 5-6 in unique rows 360A of its associated partial sounding feedback matrix $V_{i+2}$. The correction factor for adjusting rows 360A is determined from redundantly sounded rows 360B in the $V_{i+2}$ matrix and 362A in the subject matrix $V_{i+3}$. These rows reflect the sounding feedback information on the subject and neighboring tone for WAP antennas 7-8. The WAP determines a correction factor for the redundant rows and applies it to unique rows 360A. The resultant adjusted rows 362C are vertically concatenated onto the partial sounding matrix $V_{i+3}$ of the subject tone as adjusted new rows 362C. The WAP then repeats the same procedure for the other contributing neighboring tone, i.e. tone "i+4". The neighboring tone "i+4" is identified as having partial sounding feedback for WAP antenna 3-4 in unique rows 364A of its associated partial sounding feedback matrix $V_{i+4}$. Next, a correction factor for adjusting rows 364A is determined from redundantly sounded rows 364B in the $V_{i+4}$ matrix and 362B in the subject matrix $V_{i+3}$. These rows reflect the sounding feedback information on the subject and neighboring tone for WAP antennas 1-2. The WAP determines a correction factor for the redundant rows and applies it to unique rows 364A. The resultant adjusted rows are vertically concatenated onto the partial sounding matrix $V_i$ as adjusted new rows 362D. The resultant full beamforming matrix Vi+3 for the subject tone includes contributions from the two neighboring tones "i+2" and "i+4".

Each of the OFDM tones 243 is processed in the same manner and once all are determined the resultant full beamforming matrices "$V_n$" 246 are used for spatially mapping transmission on all ODFM sub-channels/tones of the selected communication channel of subsequent downlink communication packets to the targeted station(s) 120.

FIGS. 4A-B are system views of a multi-user (MU) multiple-input multiple-output (MIMO) downlink to stations with constrained sounding capabilities using a prior art sounding (FIG. 4A) and a composite set of partial soundings in the frequency domain, i.e. FDCS, in accordance with an embodiment of the invention (FIG. 4B) respectively.

FIG. 4A shows the Prior Art WAP 100 discussed above in connection with FIGS. 1A-B effecting an MU-MIMO downlink to both stations 420 and 440. Station 420 is identified as a 2×2 device having two antenna and supporting up to 2 streams of downlink and uplink communications and four streams of sounding feedback. The station has a baseband section 422 and a RF section 430 coupled to 2 MIMO antennas 432. The baseband receive portion is shown and the corresponding transmit portion is not. The DFT modules 428A-B are coupled to a corresponding one of the two antenna 432, to transform received communications from the time to the frequency domain. The output bins 426A-B of the DFT modules are coupled to the input of the equalizer 424. The sounding feedback capabilities of the station 420 do not match the WAPs capabilities in terms of number of streams and antennas. The WAP could handle up to 8 streams on a downlink sounding, but can't do so because the station is only capable of providing sounding feedback for up to four streams. Station 440 is also a 2×2 device. The station has a baseband section 442 and a RF section 450 coupled to 2 MIMO antennas 452. The DFT modules 448A-B are coupled to a corresponding one of the two antenna 452, to transform received communications from the time to the frequency domain. The output bins 446A-B of the DFT modules are coupled to the input of the equalizer 444. The sounding feedback capabilities of the station 440 do not match the WAPs capabilities in terms of number of streams and antennas. The WAP could handle up to 8 streams on a downlink sounding, but can't do so because the station is only capable of providing sounding feedback for up to four streams. After the single sounding of each station by the WAP a 4×2 link from the WAP to each station is established using the under dimensioned sounding feedback responses 434, 454 from respectively station 420 and 440. The beamforming strength 457 of the MU-MIMO downlink is limited by the under dimensioned sounding available from both stations.

FIG. 4B shows the WAP 200 shown in FIG. 2A-2B establishing a MU-MIMO downlink to the above discussed stations 420 and 440. The WAP transmits a composite sounding in the frequency domain, a.k.a. FDCS, and each station provides a single composite sounding feedback packet 435 for station 420 and 455 for station 440. Each feedback packet contains the concurrent set of partial sounding responses for each of the OFDM tones. Each station's partial sounding feedback is expanded as discussed in FIG. 3C or FIG. 3F into corresponding full beamforming matrices 436 and 456 for station 420 and 440 respectively. These are then used to spatially map orthogonal communications in each subsequently transmitted MU-MIMO downlink packet of streams "ab" to station 420 and "cd" to station 440. The channels on each link between the WAP and a corresponding one of the stations are fully characterized and thus each link is able to support 8×2 communications. The beamforming strength and focus 458 of the MU-MIMO downlink MU-MIMO packet transmission is enhanced by virtue of the fully dimensioned beamforming matrices 436, 456 determined by the WAP.

Figure 5A:
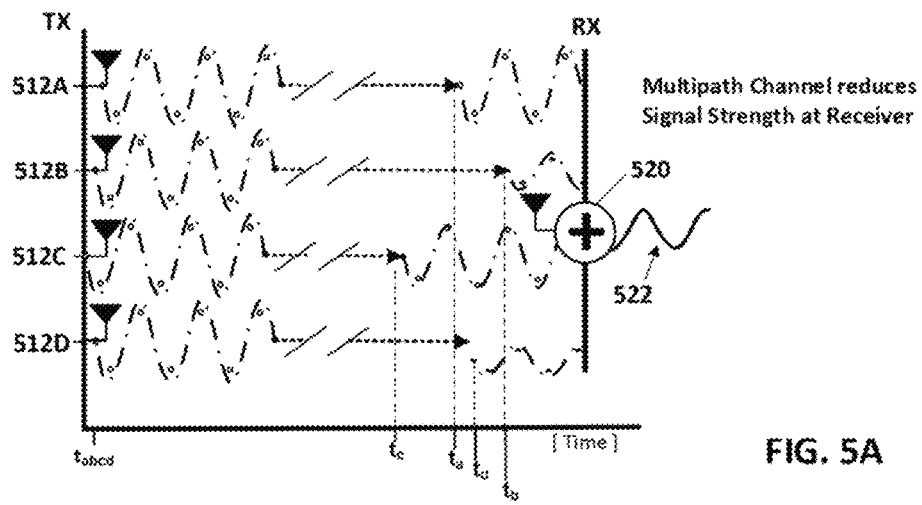
FIGS. 5A-C are signal diagrams of a MIMO downlink to a station with constrained sounding capabilities: without beamforming (FIG. 5A), with beamforming resulting from a prior art sounding (FIG. 5B) and with beamforming resulting from a composite sounding in the frequency domain in accordance with an embodiment of the invention (FIG. 5C)
Figure 5B:
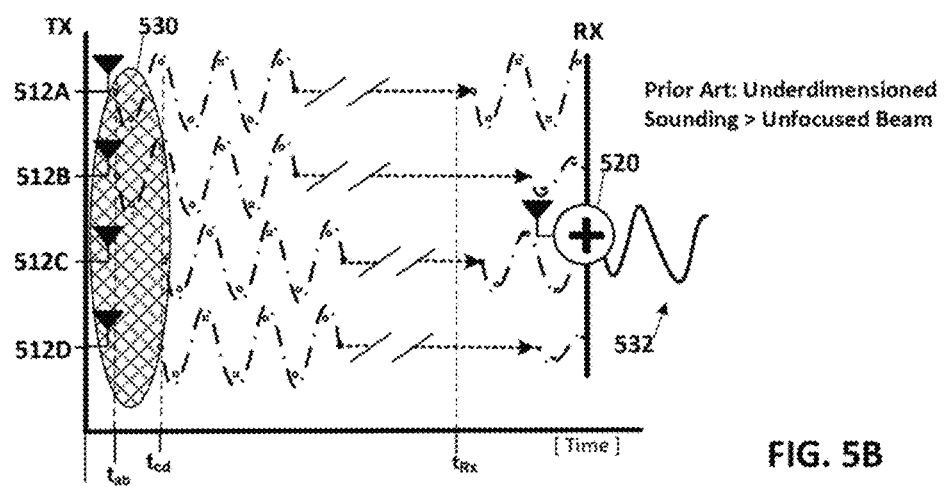
Figure 5C:
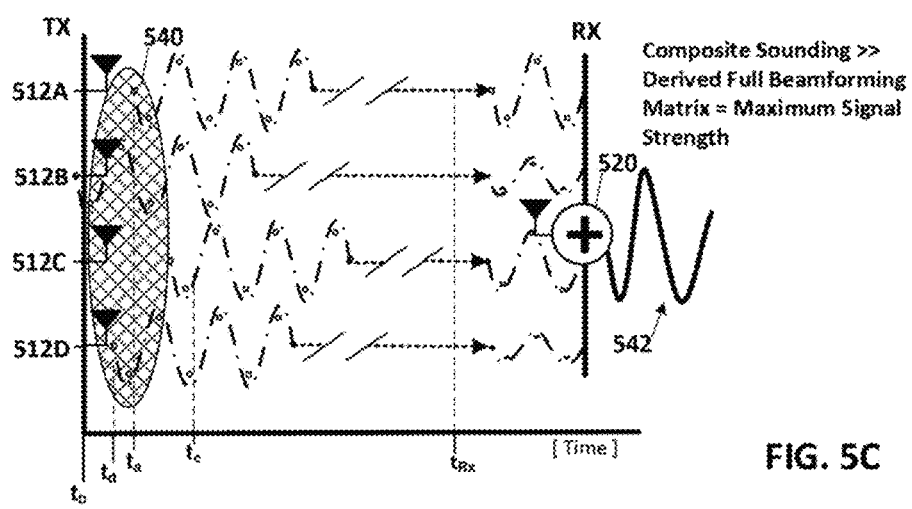

FIGS. 5A-C are signal diagrams of a MIMO downlink to a station with constrained sounding capabilities: without beamforming (FIG. 5A), with beamforming resulting from a single prior art sounding (FIG. 5B) and with beamforming resulting from a composite sounding in the frequency domain in accordance with an embodiment of the invention (FIG. 5C).

FIG. 5A is a signal diagram of a MIMO downlink without beamforming to a station with constrained sounding capabilities. Four WAP antennas 512A-D are shown initiating transmission (TX) of a common sinusoidal waveform of equal amplitude and frequency over each of the antennas starting at the same time, $t_{abcd}$. Each signal exhibits a different delay and attenuation upon arrival at the RX antenna and summer. This is due to the differences in the individual paths or channel between each of the four TX antenna and the single receive (RX) antenna and adder 520. The result is that there is considerable destructive interference between each upon arrival at the RX antenna and adder. The aggregate signal 522 at the output of the adder is severely attenuated in amplitude as shown, and may also exhibit overtones or higher frequency harmonics than the original signal due to different transit times and associated phase shifts relative to the other signals.

FIG. 5B is a signal diagram of a MIMO downlink with beamforming to a station with constrained sounding capabilities. The beamforming 530 is partial since the channel sounding is under dimensioned due to the inability of the receiving station to fully characterize all the streams transmitted by the WAP in its sounding feedback response. In the example shown, the associated sounding feedback is assumed to be limited to two streams. Four WAP antennas 512A-D are shown initiating transmission (TX) of the common sinusoidal waveform of equal amplitude and frequency at two discrete times, $t_{ab}$ and $t_{cd}$ as determined from the partial sounding. The staggered transmission times are designed to align the received signals with one another so that they constructively interfere with one another. However, as shown in the resultant sum signal 532 at the output of adder 520 the under dimensioned sounding limited to two streams, limits the effectiveness of the beamforming.

FIG. 5C is a signal diagram of a MIMO downlink without beamforming to a station with constrained sounding capabilities. Four WAP antennas 512A-D are shown initiating transmission (TX) of a common sinusoidal waveform of equal amplitude and frequency over each of the antennas starting at individually staggered or offset times $t_b$, $t_d$, $t_a$, $t_c$ designed based on a prior composite sounding in the frequency domain, to synchronize the time of arrival and the resultant phase of all signals at the RX antenna and adder 520. The composite sounding in the frequency domain performed by the WAP including the expansion of the partial sounding feedback on each subject and at least one neighboring sub-channel/tone among the OFDM sub-channels into a full sounding feedback matrix allows the WAP to fully characterize the entire channel including all paths between the four TX and the single RX antenna with a full beamforming matrix. The result is that there is considerable constructive interference between all four signal when they arrive at the receiving stations antenna and summer 520. The aggregate signal 542 at the output of the adder has increased in amplitude due to the constructive interference with the other signals which collectively have an additive effect on received signal strength. This maximizes received signal strength with the same transmit power, and is one of the attributes of effective beamforming.

Figure 6:
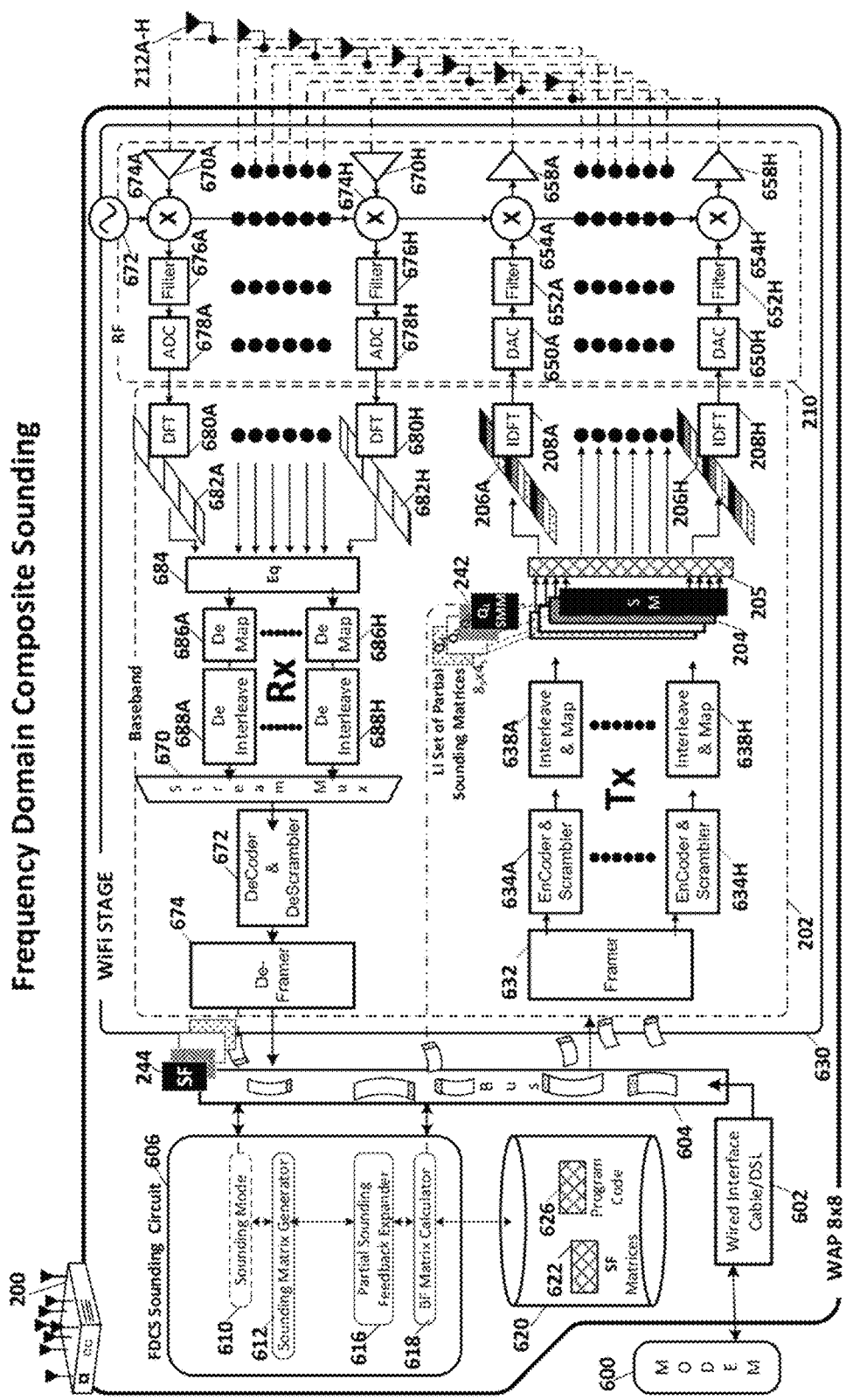
FIG. 6 is a hardware block diagram of a MU-MIMO WAP with support for either a single full sounding or a single composite sounding in the frequency domain depending on the relative capabilities of the WAP and the target station(s)

FIG. 6 is a hardware block diagram of a MU-MIMO WAP 200 shown in FIGS. 2A-B and FIG. 4B. The WAP supports either single full sounding or a single composite sounding in the frequency domain depending on the relative capabilities of the WAP and the target station(s). The WAP in this embodiment of the invention is identified as an 8×8 WAP supporting as many as 8 discrete communication streams over eight antennas 680. The WAP couples to the Internet via an integral wired interface 602 to a cable or digital subscriber line (DSL) modem 600. A packet bus 604 couples the modem to the MU-MIMO WiFi stage 630. The WLAN stage includes a baseband module 202 and a radio frequency (RF) module 210 coupled to MIMO antennas 212A-H.

In the baseband portion 202 communications wireless transmitted to or received from each user/station are processed. The baseband portion is dynamically configurable to support SU-MIMO or MU-MIMO transmission to MU groups of two or more users/stations. The RF portion 210 handles the upconversion on each of 8 transmit paths and wireless transmission initiated in the baseband. The RF portion also handles the downconversion of the signals received on the 8 receive paths and passes them for further processing to the baseband.

Transmission:

The transmit path/chain includes the following each including the following discrete and shared components. Each sounding or data packet for wireless transmission to one or more stations is framed in the framer 632. Next each stream is encoded and scrambled in a corresponding one of the encoder and scramblers 634A-H followed by interleaving and mapping in a corresponding one of the interleaver mappers 638A-H. Next all transmissions are spatially mapped in the configurable spatial mapper 204. In the example shown in FIG. 6 the spatial mapper is shown in a configuration suitable for a FDCS of the training/sounding field of a sounding packet.

The spatial mapper 204 is configurable to suit the type of packet being transmitted, including for example: a full NDP sounding packet, a FDCS NDP sounding packet, and a data packet (MPDU). For a full sounding packet, and in particular the training/sounding field thereof, the spatial mapper accepts eight training streams at the input and spatially maps them with a single spatial mapping matrix onto the all the input bins of the IDFTs 208A-H at the output. For a FDCS NDP sounding packet and in particular the training/sounding field thereof, the spatial mapper accepts four training streams at the input and spatially maps them with a corresponding one of two or more linearly independent partial sounding matrices 242 onto selected tones, via the tone-subset switch fabric 205, of selected input bins 206A-H of the IDFT 208A-H at the output. For a MPDU data packet the spatial mapper accepts input of between 1-to-8 input streams and spatially maps them via a beamforming matrix onto all the input bins 682A-H of all the IDFT 208A-H at the output.

In an alternate embodiment of the invention the spatial mapper comprises: a discrete pair of input registers coupled via a discrete multiplier to the input bins 206A-H of each of the IDFT 208A-H. A data register one of each pair of registers accepts input of the training or data stream for spatial mapping each OFDM tone. A spatial mapping matrix one of each pair of registers accepts input of the required SMM matrix for full or composite sounding in the frequency domain or for subsequent transmission of a downlink data packet. Each discrete multiplier multiplies the contents of the corresponding pair of registers and outputs the spatially mapped product onto the associated IDFT input bin for wireless transmission in the RF stage.

Each IDFT is coupled to a corresponding one of the 8 transmit path/chain components in the RF stage 210 for wireless transmission on an associated one of MIMO antenna 212A-H. Specifically each IDFT couples to an associated one of the digital-to-analog converters (DAC) 650A-H, filters 652A-H, upconverters 654A-H, a common oscillator 672 for the upconverters, power amplifiers 658A-H and MIMO antenna 212A-H.

Reception:

Received communications on the WAP's array of MIMO antenna 212A-H are subject to RF processing including downconversion. There are eight receive paths each including the following discrete and shared components: a low noise amplifier 670A-H, a downconverter 674A-H, the common oscillator 672 for each of the downconverters, a filter 676A-H an analog-to-digital converter (ADC) 678A. The digital output from each ADC is passed to a corresponding one of the discrete Fourier transform (DFT) components 680A-H in the baseband portion 202 of the WiFi stage.

Receive processing in the baseband stage includes the following shared and discrete components including: an equalizer 684 coupled to the output of the DFTs 880A-H. The received streams at the output of the equalizer are subject to demapping and deinterleaving in a corresponding number of the demappers 686A-H and deinterleavers 688A-H. Next any streams which make up a single communication are multiplexed in the multiplexer 672. Next the received stream(s) are decoded and descrambled in the decoder and descrambler component 672, followed by de-framing in the deframer 674.

The WAP 200 also includes a FDCS sounding circuit 606 coupled to storage 620. The FDCS sounding circuit in an embodiment of the invention handles both single packet full soundings and single packet FDCS soundings. In another embodiment of the invention the FDCS sounding circuit is dedicated exclusively to FDCS soundings. The FDCS sounding module includes a sounding mode circuit 610, a sounding matrix generator 612, a partial sounding feedback expander circuit, and a beamforming matrix calculator 618.

The sounding mode circuit 610 is integrated with WiFi Stage components, and includes in an embodiment of the invention: a control unit to fetch and execute related program code 626 instructions from non-volatile storage 620, an arithmetic and logic unit to perform the required arithmetic and logical operations, registers, an internal clock and busses, and logic gates to control information flow. The sounding mode circuit couples to the WiFi receive path components, and particularly the de-framer 674 to determine the capabilities of the associated stations from packets received from the associated stations during a capabilities exchange. These capabilities include: bandwidth, number of streams supported, number of feedback streams supported, IEEE 802.11 standard support, etc. The sounding mode circuit designates one of a full sounding mode and a composite sounding mode for sounding at least one of the associated stations based on the capabilities of the station and the WAP. In another embodiment of the invention the sounding mode circuit designates one of the composite sounding mode and the full sounding mode based on whether a number of sounding streams supported by the WAP exceeds the number of streams contained in a sounding response from at least one station. In another embodiment of the invention the sounding mode circuit designates the composite sounding mode for a multi-user (MU) MIMO downlink if any one of the at least two stations targeted for the MU MIMO downlink does not support sounding on an aggregate number of streams allocated for the MU-MIMO downlink. In an embodiment of the invention the sounding mode circuit is optional, in the sense that all soundings are conducted as FDCS soundings regardless of whether the feedback streams of the station(s) match the maximum streams supported by the WAP or not.

The sounding matrix generator 612 is integrated with WiFi Stage components, and includes in an embodiment of the invention: a control unit to fetch and execute related program code 626 instructions from non-volatile storage 620, an arithmetic and logic unit to perform the required arithmetical and logical operations, registers, an internal clock and busses, and logic gates to control information flow. The sounding matrix generator has an input coupled to the sounding mode circuit and an output coupled to the spatial mapping matrix input of the spatial mapper 204. In an embodiment of the sounding matrix generator is responsive to the composite sounding mode designation by the sounding mode circuit to generate the set of "N" partial SMM, each linearly independent (LI) with respect to one another and to provide the #N LI SMM to the input of the spatial mapper component. In another embodiment of the invention the sounding matrix generator is responsive to the composite sounding mode designation by the sounding mode circuit to generate the set of "N" partial SMM each spatially mapping to an associated subset of the plurality of the WAP's antennas. In another embodiment of the invention the sounding matrix generator is responsive to a full sounding mode designation by the sounding mode circuit to generate a single full spatial mapping matrix and to provide the single full SMM to the input of the spatial mapper component. In an embodiment of the invention the sounding matrix generator generates the "N" LI SMM using a lookup table. In another embodiment of the invention the sounding matrix generator generates the "N" LI SMM using a trial and error method or via direct calculation.

The spatial mapper component 204 in FIG. 6 is shown spatially mapping a composite sounding in the frequency domain, i.e. an FDCS sounding. The spatial mapper is also configurable handle a full sounding. The spatial mapper is also configurable to handle a subsequent downlink spatially mapping all tones with a full beamforming matrix. When processing a FDCS sounding the spatial mapper component 204 spatially maps the wireless transmission of the OFDM tones in the sounding field of the single sounding packet in sequential sets of "N" neighboring tones with each of the "N" tones in each sequential set spatially mapped with a corresponding one of the "N" partial SMM. In another embodiment of the invention the spatial mapper component spatially maps the wireless transmission of a sounding field of a single MIMO sounding packet with one of a full SMM and a set of "N" partial SMM each spatially mapping corresponding neighboring ones of the OFDM tones responsive respectively to the full and composite sounding mode designations by the sounding mode circuit. In another embodiment of the invention the spatial mapper component spatially maps the wireless transmission of the OFDM tones in the sounding field of the single sounding packet in sequential sets of "N" neighboring tones with each of the "N" tones in each sequential set spatially mapped with a corresponding one of the "N" partial SMM.

The partial sounding feedback expander circuit 616 is integrated with WiFi Stage components, and includes in an embodiment of the invention: a control unit to fetch and execute related program code 626 instructions from non-volatile storage 620, an arithmetic and logic unit to perform the required arithmetical and logical operations, registers, an internal clock and busses, and logic gates to control information flow. The partial sounding feedback expander circuit accepts input in the composite sounding mode of FDCS partial sounding feedback 244 directly from the receive path de-framer 674. It expands partial sounding feedback received from the at least one station in response to the single MIMO sounding packet, into a full sounding feedback and provides that to the beamforming matrix calculator. In an embodiment of the invention the partial sounding feedback expander circuit expands the partial sounding feedback by combining selected portions of partial sounding feedback matrices received from the at least one station in response to the sounding, into the full sounding feedback matrix. In another embodiment of the invention the partial sounding feedback expander circuit expands the partial sounding feedback by concatenating a selected portion of a partial sounding feedback matrix for at least one neighboring OFDM tone with a partial sounding feedback matrix for each subject OFDM tone. In still another embodiment of the invention the partial sounding feedback expander circuit identifies a correction factor between redundant portions of the partial sounding feedback matrices of a subject and at least one neighboring OFDM tone, corrects a unique portion of the partial sounding feedback of at least one neighboring tone with the correction factor, and concatenates the corrected unique portion of the partial sounding feedback of the at least one neighboring tone with the partial sounding feedback matrix of the subject tone during the expansion.

The beamforming matrix calculator 618 is integrated with WiFi Stage components, and includes in an embodiment of the invention: a control unit to fetch and execute related program code 626 instructions from non-volatile storage 620, an arithmetic and logic unit to perform the required arithmetic and logical operations, registers, an Internal clock and busses, and logic gates to control information flow. The beamforming matrix calculator couples to the de-framer 674 to accept input of full sounding feedback directly therefrom in the full sounding mode, or to the partial sounding feedback expander circuit to receive full sounding feedback directly from that component in the composite sounding mode. The beamforming matrix calculator calculates a full beamforming matrix for transmitting downlink communications to the at least one station from the full sounding feedback provided by one of the partial sounding feedback expander circuit in the composite sounding mode, and full sounding feedback received directly from the at least one station in the full sounding mode. The beamforming matrix calculator has an output coupled to the spatial mapping matrix input of the spatial mapper component 204 on the transmit path of the WAP, for providing the beamforming matrix "V" for spatially mapping subsequent downlink packet transmissions to the targeted station (SU-MIMO) or the full beamforming matrix "W" for spatially mapping subsequent downlink packet transmissions to two or more targeted stations (MU-MIMO).

In an embodiment of the invention the FDCS sounding circuit may be implemented in a very large scale integrated circuit (VLSI) coupled to the transmit and receive path components of the WAP and including a: control unit to fetch and execute program code 626 instructions from non-volatile storage 620, an arithmetic and logic unit to perform the required arithmetic and logical operations, registers, an internal clock and busses, and logic gates to control information flow.

FIG. 7 is a process flow diagram of processes associated with enhanced sounding capabilities of a SU-MIMO or MU-MIMO WAP in accordance with an embodiment of the current invention. Processing begins at process block 700 in which a capabilities exchange between the WAP and at least one targeted station is initiated. In this capabilities exchange the communication capabilities of the station are determined such as: number of data streams supported, number of antenna; number of streams in sounding response or feedback; the modulation and coding schema (MCS) and supported bandwidth and IEEE 802.11 protocol(s) supported. Then in process 702 a determination is made as to whether the number of communication streams supported by the WAP exceeds the number of streams which any one of the station(s) targeted for downlink can characterize in sounding feedback. Next in decision process 704 a determination is made to enter full or composite sounding mode based on whether the WAP streams exceeds the stations feedback stream support. If the targeted station(s) provide full sounding feedback on all streams supported by the WAP then control passes to the sounding transmission block of processes 720 and specifically the full sounding branch thereof comprising processes 722-724. In process 724 a single spatial mapping matrix is generated for spatially mapping all OFDM tones in a sounding field of a sounding packet to all the WAP's antenna. Then in process 724 the explicit sounding packet is transmitted by the targeted stations(s).

Then in the block of sounding feedback reception processes 740 and specifically the full sounding feedback branch thereof, the full sounding matrix from the station(s) targeted for the full explicit sounding is received. Next in process 744 a full beamforming matrix is calculated from the full sounding feedback. Once the full beamforming matrix has been calculated control passes to the downlink transmission in process 770 of an MU-MIMO or SU-MIMO downlink MPDU packet spatially mapped onto each of the WAP's antenna using the full beamforming matrix calculated in process 744.

The aforesaid processes 702, 704, 722,724, 742, 744 are shown in dashed lines, because in an embodiment of the invention they are not required, since all soundings to all station(s) regardless of their capabilities, are conducted using composite soundings in the frequency domain, i.e. FDCS to determine the beamforming matrix "V". for SU-MIMO or "W" MU-MIMO subsequent downlink packet transmission.

The composite sounding branch of processes 710-730 and 750-760, utilize composite soundings in the frequency domain to overcome the lack of support in the station(s) for sounding feedback which matches the full capability of the WAP. If a determination is made in decision process 704 that the number of WAP streams exceeds the station's feedback capability, then control passes to the sounding transmission block of processes 720 and specifically the composite FDCS branch of processes within that block. The station is induced to send a partial sounding response for groups of the OFDM tones of the communication channel in a single sounding feedback packet to the WAP which allow the WAP, by virtue of the linear independence of the partial soundings of each sub-channel in each group of tones from one another, to expand the partial matrices to a full beamforming matrix thereby allowing the WAP to exploit its full communication capabilities for subsequent downlink communications with the station(s). In the initial frequency domain composite sounding process 710 partial sounding tone groups are identified across all the OFDM sub-channels/tones of the communication channel with each group having the number "N" tones per group required to fully characterize the channel for all the WAP's antenna and supported streams. Next in process 712 a set of "N" linearly independent spatial Mapping Matrices (LI SMM) are generated for each of the "N" tones in each group. Control is then passed to decision process 726, in which the ordered processing of each tone in each tone group is initiated. On the first pass the first tone in each tone group of the OFDM tones in the sounding field of a sounding packet is in process 728 spatially mapped with the first of the #N linearly independent SMM. On the second pass the second tone in each tone group in the OFDM tones in the sounding field of a sounding packet is in process 728 spatially mapped with the first of the #N linearly independent SMM. Once all tones in a group have been spatially mapped with a corresponding one of the #N LI SMM control passes to process 730. In process 730 the explicit sounding packet with the training/sounding field with the spatially mapped FDCS OFDM tones is transmitted to station(s) targeted for the SU-MIMO or MU-MIMO sounding feedback.

Control then passes to the sounding feedback reception block of processes 740 and particularly the branch associated with processing partial sounding feedback from the FDCS sounding. In process 750 the single sounding feedback packet from the targeted station(s) with partial sounding feedback matrices for each tone is received. Control is then passed to decision process 752 in which the partial sounding feedback for each of the OFDM tones on the sounded communication channel is expanded into a full sounding feedback matrix for the subject tone. In process 754 one or more neighboring tones are identified whose partial sounding feedback will be combined with the subject tone's partial sounding feedback. Next in process 756 any required correction factors for correcting the partial sounding feedback of the neighboring tone before combination with the partial sounding feedback of the subject tone. Next in process 758 the subject tone's partial sounding feedback is combined with at least a portion of the identified neighboring tone(s) corrected partial sounding feedback to produce a full sounding feedback matrix for the subject tone. The processing of each successive tone, a.k.a. subject tone, among the OFDM tones of the communication channel continues until in decision process 752 it is determined that all tones have been processed. Then control passes to process 760 for the calculation of a full beamforming matrix for each tone from the full sounding feedback matrix for that tone determined in the prior processes. Next control is passed to the downlink packet transmission process 770 in which the MU-MIMO or SU-MIMO downlink communication packet(s) are spatially mapped onto each of the WAP's antenna using the full beamforming matrix calculated in the process 760.

The aforesaid processes repeat themselves intermittently as channel conditions change in order to maintain the efficiency of the WLAN communications.

Examples: Orthogonal Sounding with Antenna Overlap

Consider a 1×8 channel represented by $H_{1\times8}$. If the client is capable of providing 8-stream feedback, the BF feedback would consist of an 8×1 V-matrix and a 1×1 singular value σ, such that $$H_{1\times8} = U\sigma V'  \quad (1)$$

where U is a 1-dimensional unitary matrix, i.e. a complex number of norm 1. The value is unknown, since it is not part of the standard channel feedback. This means that up to a phase rotation, the V matrix is equal to:

$$V = \frac{H'_{1\times8}}{|H_{1\times8}|} \quad (2)$$

If the one-antenna client is not capable of 8-stream feedback, we can perform two successive soundings with the following two spatial mapper matrices:

$$Q_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix} \quad Q_2 = \begin{bmatrix} 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{bmatrix} \quad (3)$$

$Q_1$ can for instance be used on all even tones, while $Q_2$ can for instance be used on all odd tones. This effectively uses the first set of four antennas for the first sounding and the second set of four antennas for the next sounding.

In 11n standard there is an option that the client could feedback direct CSI information to the beamformee (H matrix in our notation). Let us call $H_1$ is a partial sounding feedback corresponding to the tone where $Q_1$ mapping matrix was sent, while $H_2$ is a partial sounding feedback corresponding to the tone with $Q_2$. To reconstruct full 8 antennas channel matrix H the AP should concatenate them together as $$\hat{H}_{1\times8} = [H_1 \ H_2]$$

To get beamforming matrix $\hat{V}_{8\times1}$, the AP should perform SVD of concatenated channel $\hat{H}_{1\times8}$. Note that in this case we are not limited to 1-antenna clients and could apply the same method to the client with up to 4 antennas, thus reconstructing matrix $$\hat{H}_{N\times8} = [H_1 \ H_2]$$

and beamforming matrix $\hat{V}_{8\times N}$ as the SVD of matrix $\hat{H}_{N\times8}$, where N is a number of antennas (=streams) at the client devices (N=1 ... 4).

Now let us roll back to the case where client provides us only matrix V (11n and SU 11ac) or matrix V together with singular values (MU 11ac). Each sounding provides as feedback a 4×1 V-matrix ($V_1$ and $V_2$ for first and second sounding respectively) and an optional 1×1 singular value ($\sigma_1$ and $\sigma_2$ for first and second sounding respectively). Assuming that the SVD is performed such that the U-matrix is 1, we now have:

$$H_{1:4} = \sigma_1 V'_1$$

$$H_{5:8} = \sigma_2 V'_2 \quad (4)$$

As such, we can reconstruct the complete channel from the two four-streams feedbacks:

$$H_{1\times8} = [\sigma_1 V'_1 \ \sigma_2 V'_2] \quad (5)$$

If we assume that the value of $\sigma_i$ does not vary much with the antennas (i.e. $\sigma_1 \cong \sigma_2 \cong \sigma$), we can even write:

$$H_{1\times8} = \sigma[V'_1 \ V'_2] \quad (6)$$

Which gives us a SVD decomposition of the complete channel based on the SVD decompositions of the two partial soundings.

If matrix V is uncompressed (11n) and client's SVD is implemented in a way that matrix U is always 1, than we can apply concatenation method for 1-antenna client to get steering matrix V to 8 antennas as $$\hat{V}_{8\times 1} = \begin{bmatrix} V_1 \\ V_2 \end{bmatrix},$$

where $V_1$ is 4×1 partial sounding response corresponding to the mapping matrix $Q_1$ and $V_2$ is 4×1 partial sounding response corresponding to the mapping matrix $Q_2$. Unlike direct CSI information, this method does not work for clients with 2 . . . 4 antennas. Unfortunately, as we will show below, even for 1-antenna clients this method is probably not sufficient. The problem in practice with this approach is that the V-matrices are usually normalized in such a way as to make the last row a real number. This means that both feedbacks win be rotated by an unknown phase and the simple concatenation will not work. Instead of (6), we therefore have:

$$H_{1:4} = e^{j\phi_1}\sigma_1 V'_1$$

$$H_{5:8} = e^{j\phi_2}\sigma_2 V'_2$$

$$H_{1\times 8} = [e^{j\phi_1}\sigma_1 V'_1 \quad e^{j\phi_2}\sigma_2 V'_2] \quad (7)$$

$\phi_1$ and $\phi_2$ are unknown, but their presence makes it impossible to directly find an SVD decomposition of the full channel based on the four-stream feedback received from the client.

A possible solution is to slightly modify the spatial mapper matrices such that at least one of the antennas is common between the two matrices. For instance:

$$Q_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix} Q_2 = \begin{bmatrix} 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \end{bmatrix} \quad (8)$$

The first sounding uses antennas 1 to 4, while the second one uses antennas 4 to 7. Note that in this case, one antenna (in this case antenna #8) is unused. Similar to the previous case, the relation between the sounding feedback and the channel is given by:

$$H_{1:4} = e^{j\phi_1}\sigma_1 V'_1(1:4)$$

$$H_{4:7} = e^{j\phi_2}\sigma_2 V'_2(1:4) \quad (9)$$

With $\phi_1$ and $\phi_2$ unknown. However, in this case we can derive a relationship between $\phi_1$ and $\phi_2$ thanks to the one-antenna overlap between the two soundings. Specifically, we have:

$$H_4 = e^{j\phi_1}\sigma_1 V'_1(4) = e^{j\phi_2}\sigma_2 V'_2(1) \quad (10)$$

Therefore:

$$e^{j\phi_2}\sigma_2 = e^{j\phi_1}\sigma_1 \times \frac{V'_1(4)}{V'_2(4)} \quad (11)$$

This means the full channel (or rather the channel using 7 of the 8 streams) can now be reconstructed as:

$$H_{1\times 7} = [e^{j\phi_1}\sigma_1 V'_1(1:4) \quad e^{j\phi_2}\sigma_2 V'_2(2:4)] \quad (12)$$

$$= e^{j\phi_1}\sigma_1 \left[ V'_1(1:4) \quad V'_2(2:4) \times \frac{V'_1(4)}{V'_2(4)} \right]$$

This gives us a direct SVD decomposition of the 7-stream channel as a function of the four-stream sounding feedbacks, namely:

$$H_{1\times 7} = e^{j\phi_1}\sigma_7 V'_7 \quad (13)$$

The single phase $\phi_1$ is still unknown, but that part of the SVD is typically irrelevant for the purposes of BF and MU-MIMO precoding. $\sigma_7$ and $V'_7$ can be expressed as:

$$V'_7 = \left[ V'_1(1:4) \quad V'_2(2:4) \times \frac{V'_1(4)}{V'_2(4)} \right] \bigg/ \left| V'_1(1:4) \quad V'_2(2:4) \times \frac{V'_1(4)}{V'_2(4)} \right| \quad (14)$$

$$\sigma_7 = \sigma_1 \times \left| V'_1(1:4) \quad V'_2(2:4) \times \frac{V'_1(4)}{V'_2(4)} \right|$$

Note that overlapping as described above comes at the expense of being able to sound the full 8-stream dimensions of the channel. However, even that can be addressed by choosing spatial mapping matrices and performing the overlap in such a way that the full 8 streams are available over a set of three consecutive tones.

For instance, we could choose the following set of matrices over each three consecutive tones (other choices are also possible):

$$Q_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix} Q_2 = \begin{bmatrix} 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \end{bmatrix} \quad (15)$$

$$Q_3 = \begin{bmatrix} 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \end{bmatrix} \ldots$$

$Q_1$ uses antennas 1-4, $Q_2$ uses antennas 4-7, $Q_3$ uses antennas 7, 8, 1 and 2. This means that any two consecutive tones have one antenna in common. Assuming the channel variation over the three consecutive tones is limited, we can reconstruct the full channel as:

$$H_{1\times 8} = [e^{j\phi_1}\sigma_1 V'_1(1:4) \quad e^{j\phi_2}\sigma_2 V'_2(2:4) \quad e^{j\phi_3}\sigma_3 V'_3(2)] \quad (16)$$

$\phi_1$, $\phi_2$ and $\phi_3$, are a priori unknown. However, thanks to the overlap between consecutive tones, both $\phi_1$ and $\phi_3$ can be expressed in terms of $\phi_2$, which allows for a direct SVD expression of the full 8-dimensional channel in function of the various four-stream feedbacks. The calculations are similar to the one for the 7-stream overlap case. Interestingly, if overlap is used, the final expression for the V-matrix (16) only depends on the V-matrix feedback of the partial soundings, meaning that even SU-type feedback can be used.

Finally we could use the set of 4 mapping matrices $$Q_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix} \; Q_2 = \begin{bmatrix} 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \end{bmatrix} \; Q_3 = \begin{bmatrix} 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{bmatrix}$$

$$Q_4 = \begin{bmatrix} 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \end{bmatrix} \ldots$$

To reconstruct full V matrix for the tone with Q2 mapping one should perform the following steps:
1) Calculate correcting coefficient from Q1 to Q2

$$\alpha = \frac{V'_2(1)}{V'_1(3)}$$

2) Calculate correcting coefficient from Q3 to Q2

$$\beta = \frac{V'_2(3)}{V'_3(1)}$$

3) Construct final 8×1 V matrix as $$\hat{V}_{8\times 1} = [\alpha V'_1(1:2) V'_2 \beta V'_3(3:4)]'$$

We assume that mapping sounding matrices cycle throughput the tones Q1, Q2, Q3, Q4, Q1, Q2, Q3, Q4 . . . . With that we can perform channel reconstruction for each tone using only two neighbors (one previous tone ad one next tone).

To reconstruct tone Q3, the AP could perform the following steps:
1) Calculate correcting coefficient from Q2 to Q3

$$\theta = \frac{V'_3(1)}{V'_2(3)}$$

2) Calculate correcting coefficient from Q4 to Q3

$$\mu = \frac{V'_3(3)}{V'_4(1)}$$

3) Construct final 8×1 V matrix as $$\hat{V}_{8\times 1} = [\mu V'_4(3:4) \theta V'_2(1:2) V'_3]'$$

One could notice, that reconstruction procedure to create 8-antennas V matrix for the tone Q3 is almost the same as for Q2, with only one exception, that we need to rearrange corrected and uncorrected matrices in the final concatenated 8×1 to match sounded antennas. Similarly, for Q1 we have neighbors Q4 and Q2 and the reconstruction process works as follows:

$$Q_4 = \begin{bmatrix} 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \end{bmatrix} \; Q_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix} \; Q_2 = \begin{bmatrix} 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \end{bmatrix}$$

1) Calculate correcting coefficient from Q4 to Q1
2) Calculate correcting coefficient from Q2 to Q1
3) Combine V1, V4 and V2 to construct 8-antennas beamforming matrix Finally, for Q4 tone we have $$Q_3 = \begin{bmatrix} 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{bmatrix} \; Q_4 = \begin{bmatrix} 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \end{bmatrix} \; Q_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix}$$

and the AP should rotate partial responses Q3 and Q1 towards Q4 to construct full V matrix.

The overlap approach can also be extended to two-antenna devices. In that case, the feedback of each sounding consists of a 2×2 diagonal $\Sigma_{2\times 2}$ matrix of singular values and an 8×2 V-matrix. Assuming we use the spatial mapper matrices without overlap, we can express the channel in function of the feedback as:

$$H_{1:2,1:4} = U_1 \Sigma_1 V'_1$$

$$H_{1:2,5:8} = U_2 \Sigma_2 V'_2 \quad (17)$$

In this case $U_1$ and $U_2$ are unknown 2-dimensional matrices, so the SVD of the full channel can not be readily obtained.

We can derive a relationship between $U_1$ and $U_2$ by using spatial mapping matrices that have two antennas in common between successive tones. For instance:

$$Q_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix} \; Q_2 = \begin{bmatrix} 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \end{bmatrix} \quad (18)$$

Note that in this case, two antennas (7 and 8) are unused, so we will effectively sound a six-dimensional channel. That restriction can also be removed in a way similar to what was done in the case of the 1-antenna client (see later).
Using $Q_1$ and $Q_2$ and the corresponding feedback, we can write:

$$H_{1:2,1:4}=U_1\Sigma_1 V'_1(1:2,1:4)$$

$$H_{1:2,3:6}=U_2\Sigma_2 V'_2(1:2,1:4) \quad (19)$$

Thanks to the overlap, we have:

$$H_{1:2,3:4}=U_1\Sigma_1 V'_1(1:2,3:4)=U_2\Sigma_2 V'_2(1:2,1:2) \quad (20)$$

Which gives:

$$U_2\Sigma_2=U_1\Sigma_1 \times V'_1(1:2,3:4)(V'_2(1:2,1:2))^{-1} \quad (21)$$

Therefore, the full (6-dimensional) channel is:

$$H_{1:2,1:6}=[U_1\Sigma_1 V'_1(1:2,1:4) U_2\Sigma_2 V'_2(1:2,3:4)]= \\ U_1\Sigma_1[V'_1(1:2,1:4)V'_1(1:2,3:4)(V'_2(1:2,1:2))^{-1}\times \\ V'_2(1:2,3:4)] \quad (22)$$

This brings us close to an SVD decomposition of the channel. Note that the columns of the V-matrix are not necessarily orthogonal, but they are linear combinations of the two non-zero modes of the channel, which is what we need for BF and MU-MIMO. If needed, explicit orthogonalization of the two columns of the V-matrix can be performed. As before, we can reconstruct the SVD of the full 8-dimensional channel (instead of 6-dimensional) by alternating the overlap over consecutive tones. Specifically, we can use the following set of matrices:

$$Q_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix} \quad Q_2 = \begin{bmatrix} 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \end{bmatrix} \quad (23)$$

$$Q_3 = \begin{bmatrix} 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{bmatrix} \quad Q_4 = \begin{bmatrix} 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \end{bmatrix}$$

Or:

$$Q_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix} \quad Q_2 = \begin{bmatrix} 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \end{bmatrix} \quad Q_3 = \begin{bmatrix} 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{bmatrix} \quad (24)$$

These sets provide an overlap of two antennas between any two consecutive tones. Assuming the channel does not change significantly over four tones, this should be sufficient to find the full SVD of the 8-dimension channel.

To reconstruct 8×2 matrix for the tone Q2 the AP should perform the following steps:

1) Calculate 2×2 correcting matrix from Q1 to Q2

$$A=V'_2(1:2,:)(V'_1(3:4,:))^{-1}$$

2) Calculate 2×2 correcting matrix from Q3 to Q2

$$B=V'_2(3:4,:)(V'_3(1:2,:))^{-1}$$

3) Construct final 8×2 V matrix as $$\hat{V}_{8\times 2}=[AV'_1(1:2) V'_2 BV'_3(3:4)]'$$

To reconstruct full 8×2 matrix for tones Q1, Q3 or 04, the AP should use the same method was shown for 1 antenna client usecase, substituting scalar operations by 2×2 matrix operations (similar to 2×2 Q2 case shown above).

In other embodiments of the invention the composite sounding in the frequency domain described and discussed above, may be applied with equal advantage to stations with any number of antenna and streams including but not limited to: 1×1, 2×2, 3×3, 4×4 . . . 8×8 and other stations without departing from the scope of the Claimed invention.

The components and processes disclosed herein may be implemented in a combination of software, circuits, hardware, and firmware, integrated with the WAP's existing transmit and receive path components, and without departing from the scope of the Claimed Invention.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A wireless access point (WAP) supporting wireless communications with associated stations on a selected orthogonal frequency division multiplexed (OFDM) communication channel; and the WAP comprising:

a plurality of antennas;

a plurality of components coupled to one another to form a plurality of transmit and receive paths each coupled to a corresponding one of the plurality of antennas for multiple-input multiple-output (MIMO) communications on OFDM tones of the selected communication channel;

a sounding mode circuit designates one of a full sounding mode and a composite sounding mode for sounding at least one of the associated stations;

a spatial mapper component spatially mapping a wireless transmission of a sounding field of a single MIMO sounding packet with one of a full spatial mapping matrix and a set of an integer "N" partial spatial mapping matrices each spatially mapping corresponding neighboring ones of the OFDM tones responsive respectively to the full and composite sounding mode designations by the sounding mode circuit;

a partial sounding feedback expander circuit coupled to the plurality of components forming the receive path and in the composite sounding mode, expanding partial sounding feedback received from the at least one station in response to the single MIMO sounding packet, into a full sounding feedback; and a beamforming matrix calculator coupled to the plurality of components forming the receive path and to the partial sounding feedback expander circuit and calculating a full beamforming matrix for transmitting downlink communications to the at least one station from the full sounding feedback provided by one of the partial sounding feedback expander circuit in the composite sounding mode, and full sounding feedback received directly from the at least one station in the full sounding mode.

2. The WAP of claim 1, further comprising:
the spatial mapper component spatially mapping the wireless transmission of the OFDM tones in the sounding field of the single sounding packet in sequential sets of "N" neighboring tones with each of the "N" tones in each sequential set spatially mapped with a corresponding one of the "N" partial spatial mapping matrices.

3. The WAP of claim 1, further comprising:
a sounding matrix generator responsive to the composite sounding mode designation by the sounding mode circuit to generate the set of "N" partial spatial mapping matrices, each linearly independent (LI) with respect to one another.

4. The WAP of claim 1, further comprising:
a sounding matrix generator responsive to the composite sounding mode designation by the sounding mode circuit to generate the set of "N" partial spatial mapping matrices each spatially mapping to an associated subset of the plurality of the WAP's antennas.

5. The WAP of claim 1, further comprising:
the partial sounding feedback expander circuit operative in the composite sounding mode to expand the partial sounding feedback by combining selected portions of partial sounding feedback matrices received from the at least one station in response to the sounding into the full sounding feedback matrix.

6. The WAP of claim 1, further comprising:
the partial sounding feedback expander circuit operative in the composite sounding mode to expand the partial sounding feedback by concatenating a selected portion of a partial sounding feedback matrix for at least one neighboring OFDM tone with a partial sounding feedback matrix for each subject OFDM tone.

7. The WAP of claim 1, further comprising:
the partial sounding feedback expander circuit operative in the composite sounding mode to identify a correction factor between redundant portions of the partial sounding feedback matrices of a subject and at least one neighboring OFDM tone, to correct a unique portion of the partial sounding feedback matrix of at least one neighboring tone with the correction factor, and to concatenate the corrected unique portion of the partial sounding feedback matrix of the at least one neighboring tone with the partial sounding feedback matrix of the subject tone.

8. The WAP of claim 1, further comprising:
the sounding mode circuit designating one of the composite sounding mode and the full mode based on whether a number of sounding streams supported by the WAP exceeds the number of streams contained in a sounding response from at least one station.

9. The WAP of claim 1, further comprising:
the sounding mode circuit designating the composite sounding mode for a multi-user (MU) MIMO downlink if any one of the at least two stations targeted for the MU MIMO downlink does not support sounding on an aggregate number of streams allocated for the MU-MIMO downlink.

10. A method for operating a wireless access point (WAP) having a plurality of antennas and supporting multiple-input multiple-output (MIMO) wireless communications with associated stations on a selected orthogonal frequency division multiplexed (OFDM) communication channel; and the method comprising the acts of:
designating one of a full sounding mode and a composite sounding mode for sounding at least one of the associated stations;
spatially mapping the wireless transmission of a sounding field of a single MIMO sounding packet with a full spatial mapping matrix responsive to full sounding mode designation and with a set of an integer "N" partial spatial mapping matrices each spatially mapping corresponding neighboring ones of OFDM tones of the communication channel responsive to the composite sounding mode designations;
receiving sounding feedback from the at least one of the associated stations;
expanding partial sounding feedback received in the receiving act into a full sounding feedback, responsive to the composite sounding mode designation in the designating act; and
calculating a full beamforming matrix for transmitting downlink communications to the at least one station from the full sounding feedback provided in one of the receiving and expanding acts responsive respectively to the full and composite sounding mode designations in the designating act.

11. The method for operating the WAP of claim 10, wherein the spatially mapping act further comprises:
spatially mapping the wireless transmission of the OFDM tones in the sounding field of the single sounding packet in sequential sets of "N" neighboring tones with each of the "N" tones in each sequential set spatially mapped with a corresponding one of the "N" partial spatial mapping matrices, responsive to the composite sounding mode designation in the designating act.

12. The method for operating the WAP of claim 10, further comprising:
generating the set of "N" partial spatial mapping matrices, each linearly independent (LI) with respect to one another, responsive to the composite sounding mode designation in the designating act.

13. The method for operating the WAP of claim 10, further comprising:
generating the set of "N" partial spatial mapping matrices each spatially mapping to an associated subset of the plurality of the WAP's antennas, responsive to the composite sounding mode designation in the designating act.

14. The method for operating the WAP of claim 10, wherein the expanding act further comprises:
combining selected portions of the partial sounding feedback matrices into the full sounding feedback matrix.

15. The method for operating the WAP of claim 10, wherein the expanding act further comprises:
concatenating a selected portion of a partial sounding feedback matrix for at least one neighboring OFDM tone with a partial sounding feedback matrix for each subject OFDM tone.

16. The method for operating the WAP of claim 10, wherein the expanding act further comprises:

identifying a correction factor between redundant portions of the partial sounding feedback matrices of a subject and at least one neighboring OFDM tone;

correcting a unique portion of the partial sounding feedback matrix of at least one neighboring tone with the correction factor; and concatenating the corrected unique portion of the partial sounding feedback matrix of the at least one neighboring tone with the partial sounding feedback matrix of the subject tone.

17. The method for operating the WAP of claim 10, wherein the designating act further comprises:

designating one of the composite sounding mode and a full sounding mode based on whether a number of sounding streams supported by the WAP exceeds the number of streams contained in a sounding response from at least one station.

18. The method for operating the WAP of claim 10, wherein the designating act further comprises:

designating the composite sounding mode for a multi-user (MU) MIMO downlink if any one of the at least two stations targeted for the MU MIMO downlink does not support sounding on an aggregate number of streams allocated for the MU-MIMO downlink.

19. A method for operating a wireless access point (WAP) having a plurality of antennas and supporting multiple-input multiple-output (MIMO) wireless communications with associated stations on a selected orthogonal frequency division multiplexed (OFDM) communication channel; and the method comprising the acts of:

spatially mapping the wireless transmission of a sounding field of a single MIMO sounding packet with a set of an integer "N" partial spatial mapping matrices each spatially mapping corresponding neighboring ones of OFDM tones of the communication channel;

receiving sounding feedback from the at least one of the associated stations;

expanding partial sounding feedback received in the receiving act into a full sounding feedback; and calculating a full beamforming matrix for transmitting downlink communications to the at least one station from the full sounding feedback provided in the expanding act.

20. The method for operating the WAP of claim 19, wherein the spatially mapping act further comprising:

spatially mapping the wireless transmission of the OFDM tones in the sounding field of the single sounding packet in sequential sets of "N" neighboring tones with each of the "N" tones in each sequential set spatially mapped with a corresponding one of the "N" partial spatial mapping matrices.

21. The method for operating the WAP of claim 19, further comprising:

generating the set of "N" partial spatial mapping matrices, each linearly independent (LI) with respect to one another.

22. The method for operating the WAP of claim 19, further comprising:

generating the set of "N" partial spatial mapping matrices each spatially mapping to an associated subset of the plurality of the WAP's antennas.

23. The method for operating the WAP of claim 19, wherein the expanding act further comprises:

combining selected portions of the partial sounding feedback matrices into the full sounding feedback matrix.

24. The method for operating the WAP of claim 19, wherein the expanding act further comprises:

concatenating a selected portion of a partial sounding feedback matrix for at least one neighboring OFDM tone with a partial sounding feedback matrix for each subject OFDM tone.

25. The method for operating the WAP of claim 19, wherein the expanding act further comprises:

identifying a correction factor between redundant portions of the partial sounding feedback matrices of a subject and at least one neighboring OFDM tone;

correcting a unique portion of the partial sounding feedback matrix of at least one neighboring tone with the correction factor; and concatenating the corrected unique portion on the partial sounding feedback matrix of the at least one neighboring tone with the partial sounding feedback matrix of the subject tone.

* * * * *